Nov. 24, 1942.　　　　P. S. SMITH　　　　2,302,722
APPARATUS FOR MAKING CEMENTED PILE FABRIC
Filed July 15, 1940　　　17 Sheets-Sheet 1
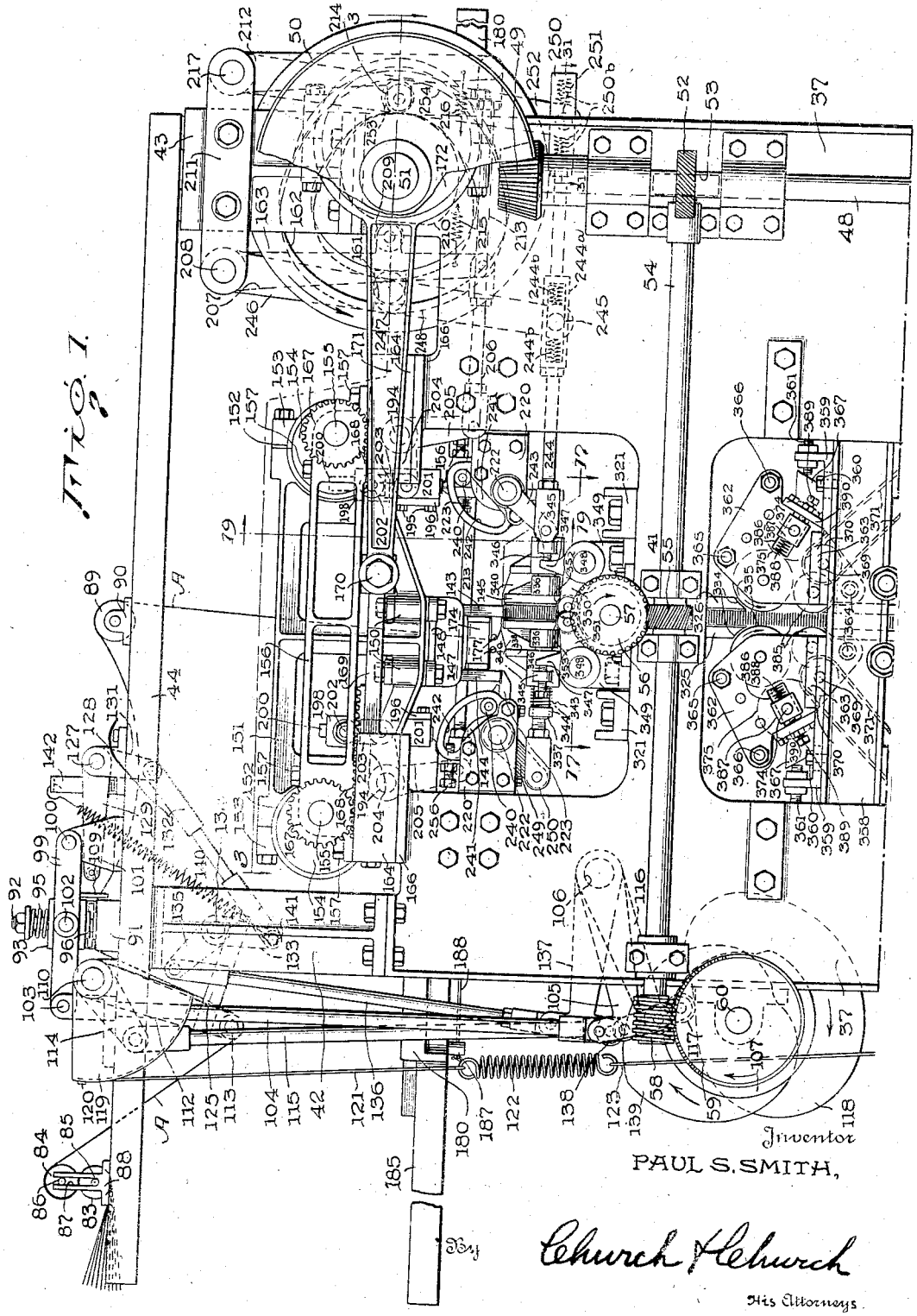
Inventor
PAUL S. SMITH,
By Church & Church
His Attorneys

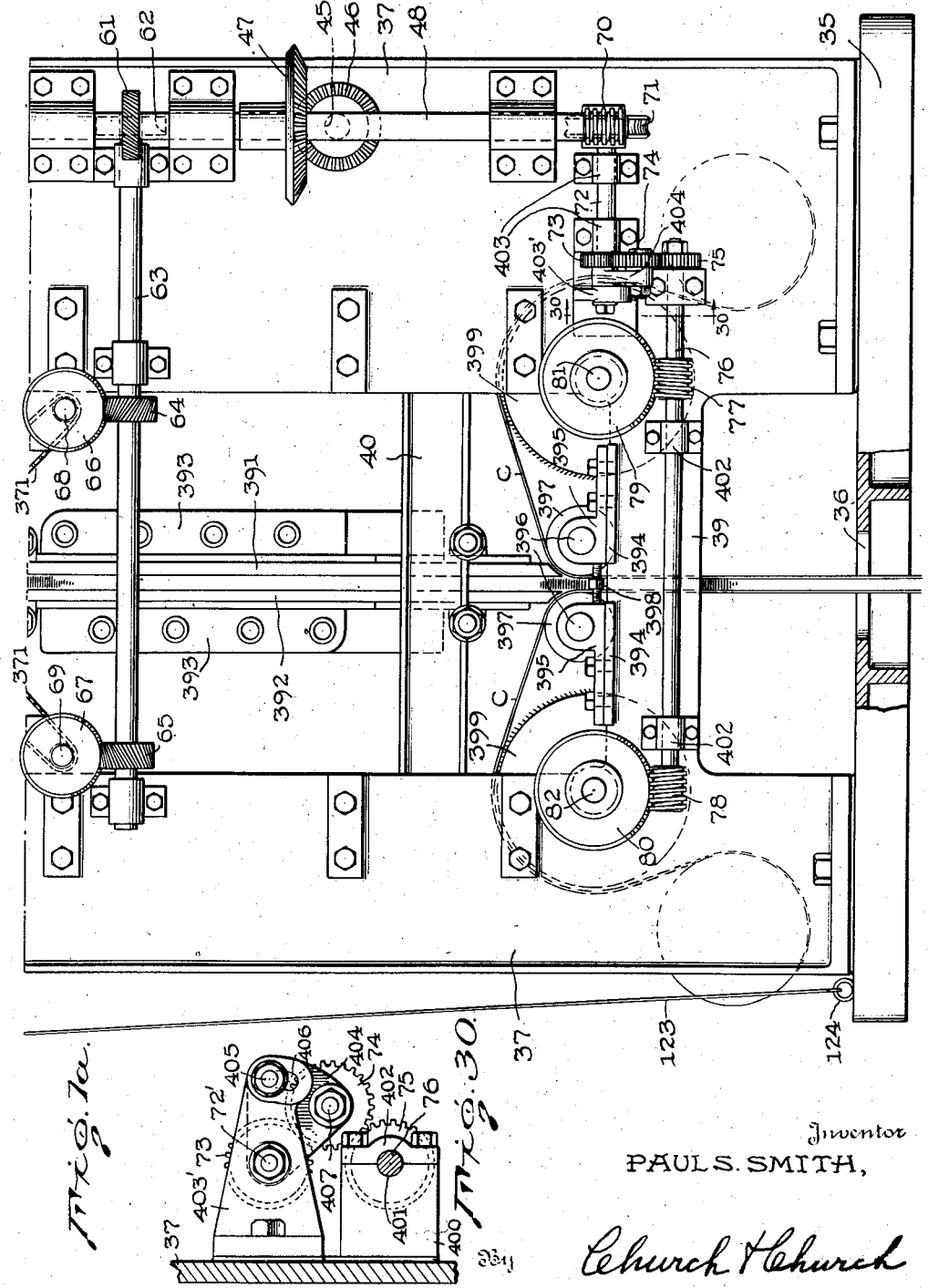

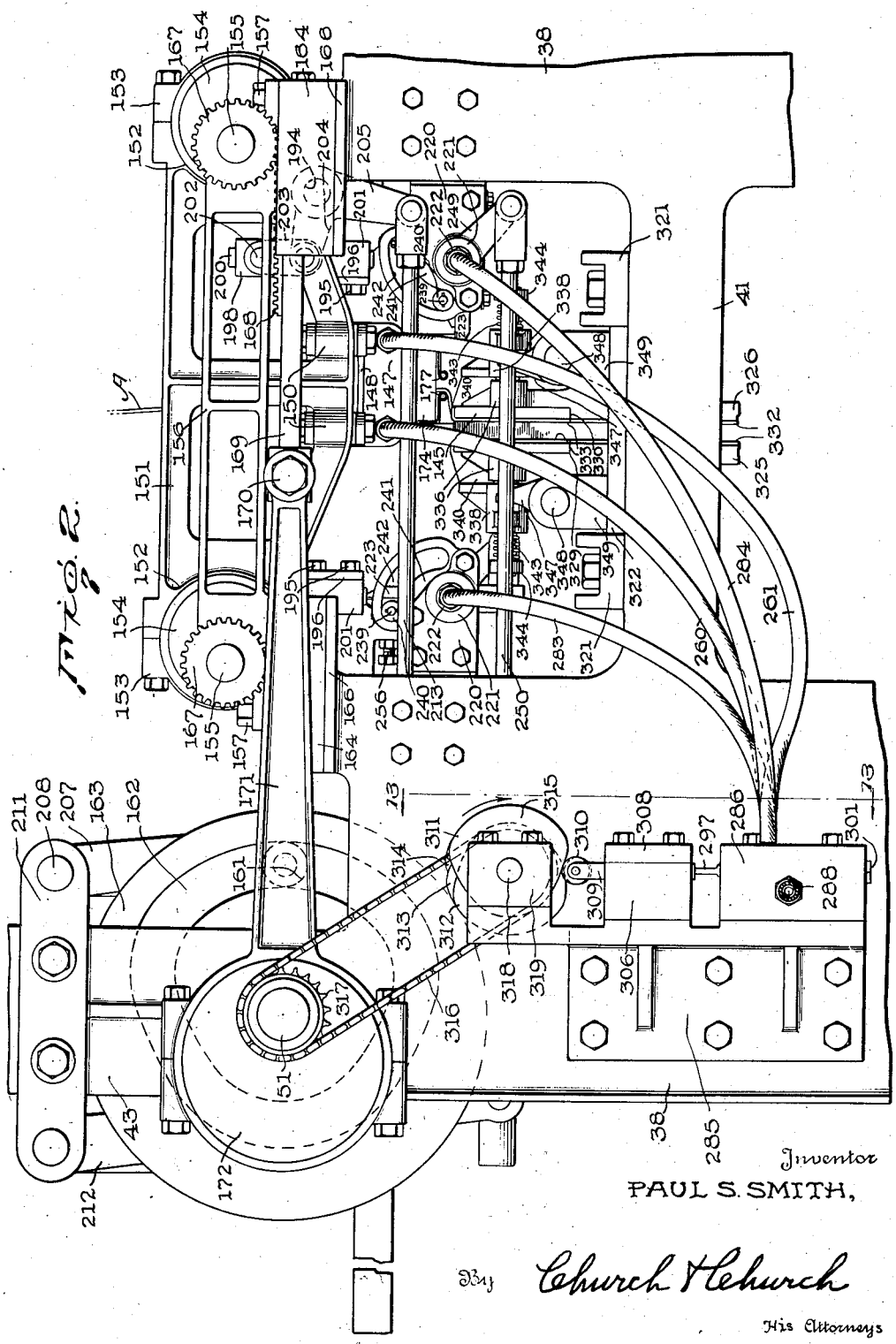

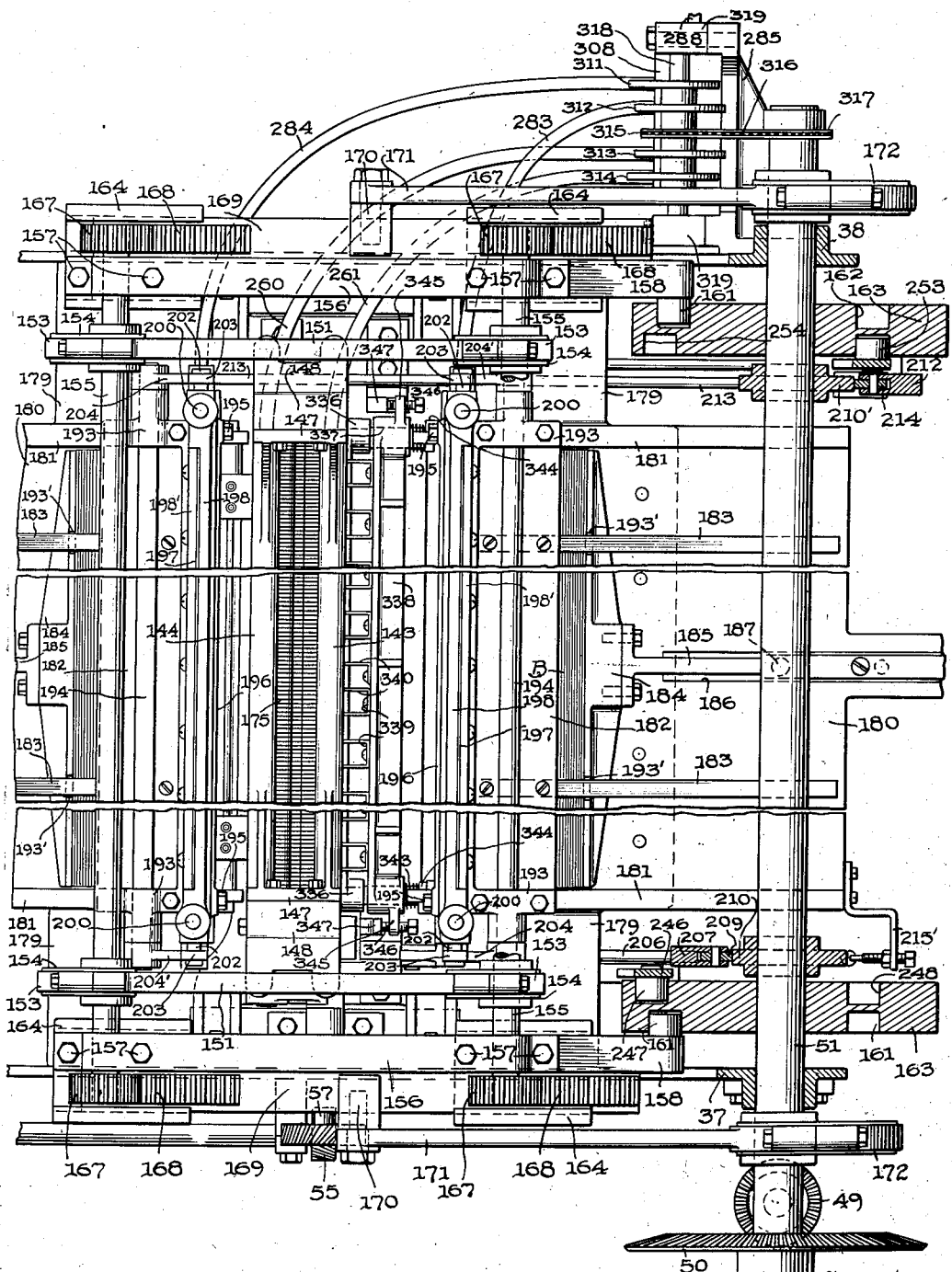

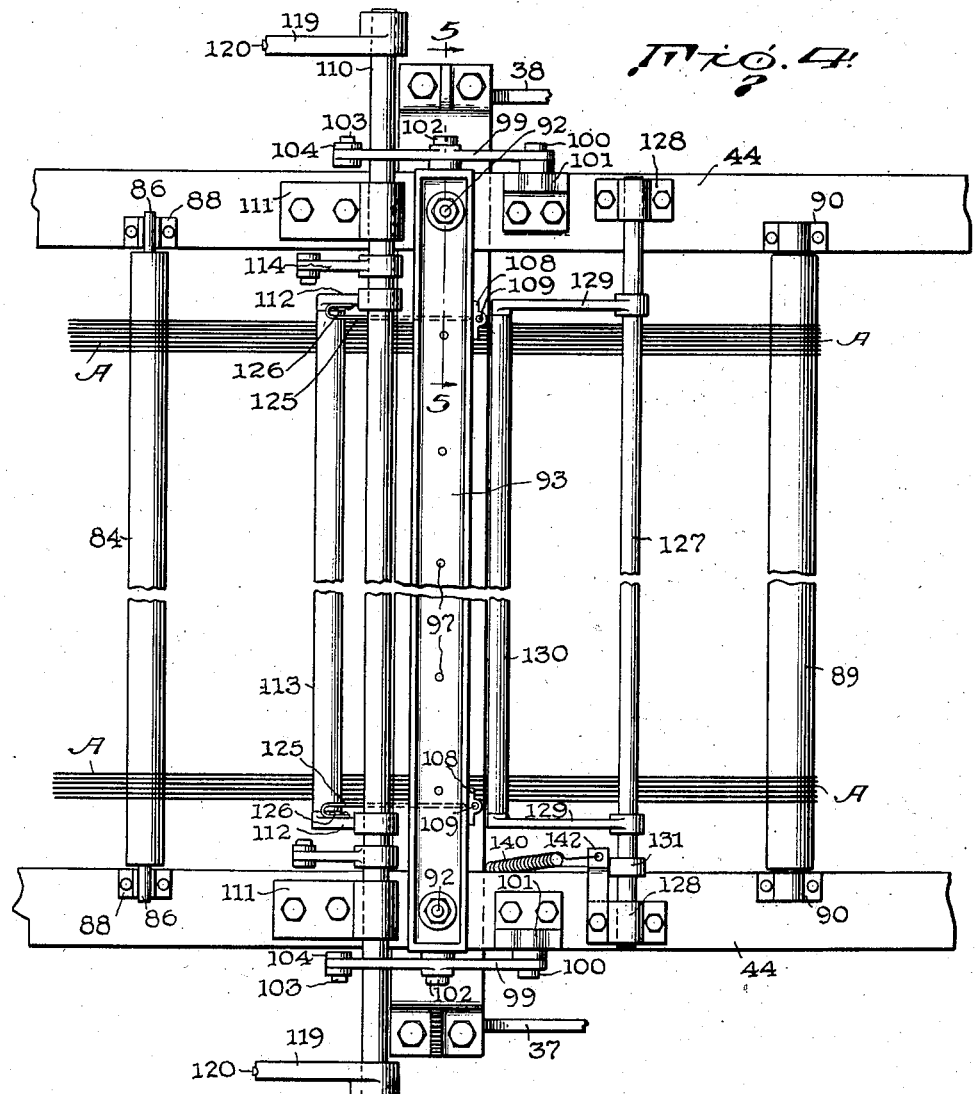

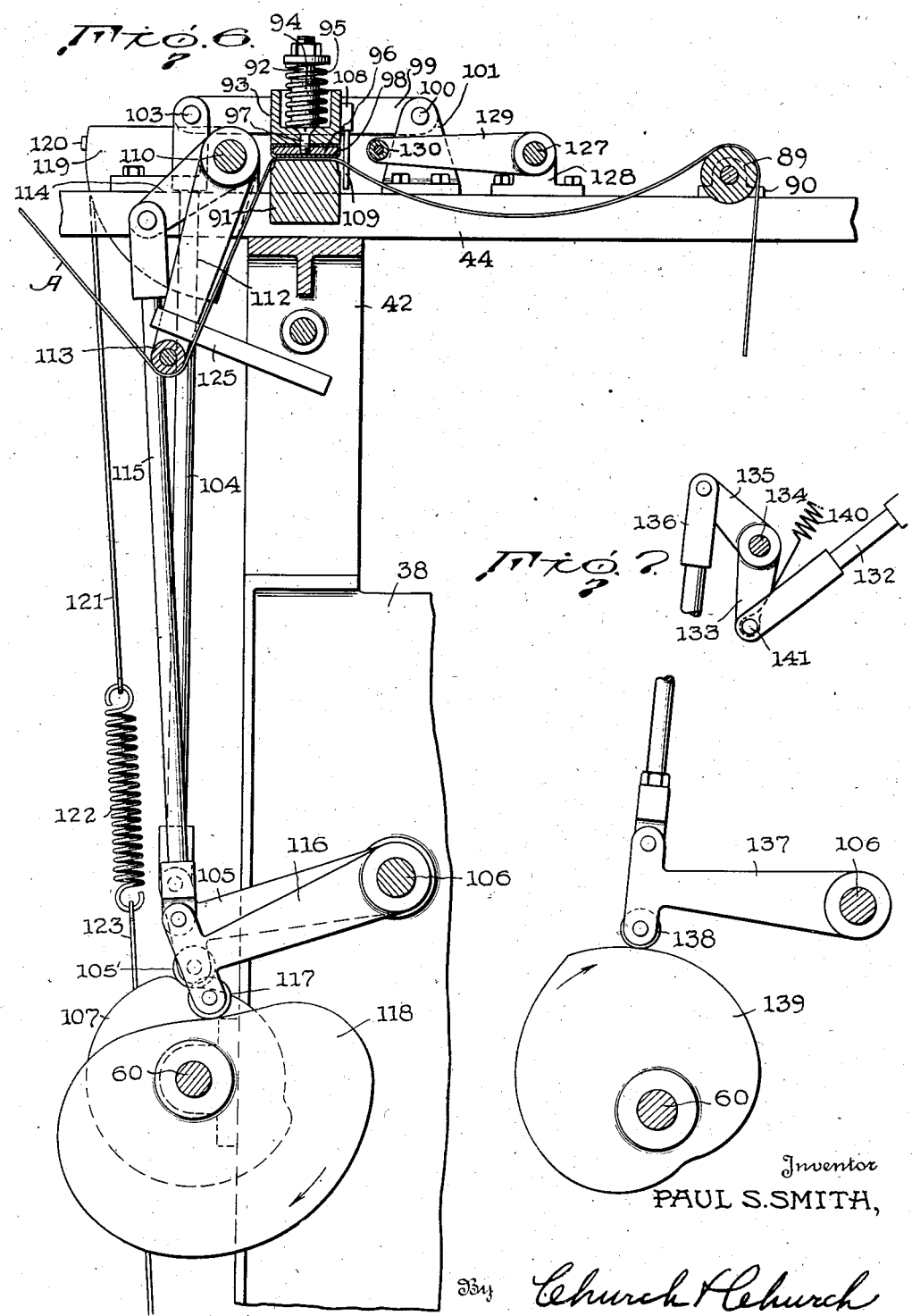

Nov. 24, 1942.    P. S. SMITH    2,302,722
APPARATUS FOR MAKING CEMENTED PILE FABRIC
Filed July 15, 1940    17 Sheets-Sheet 7
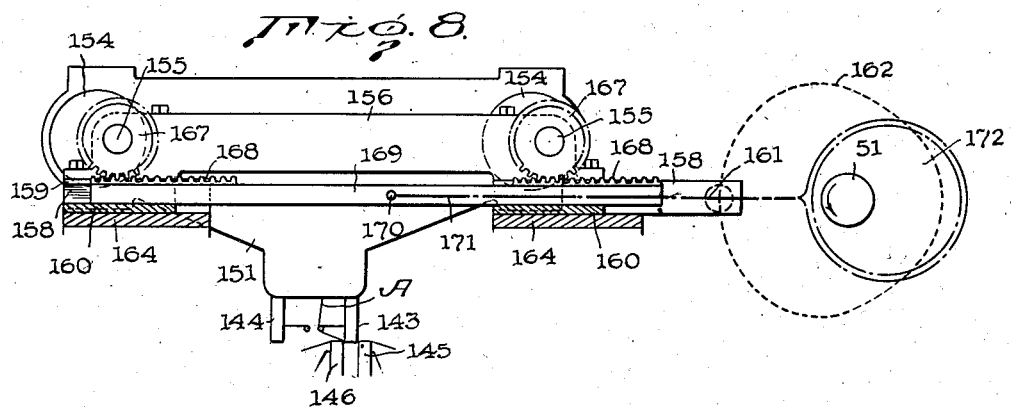
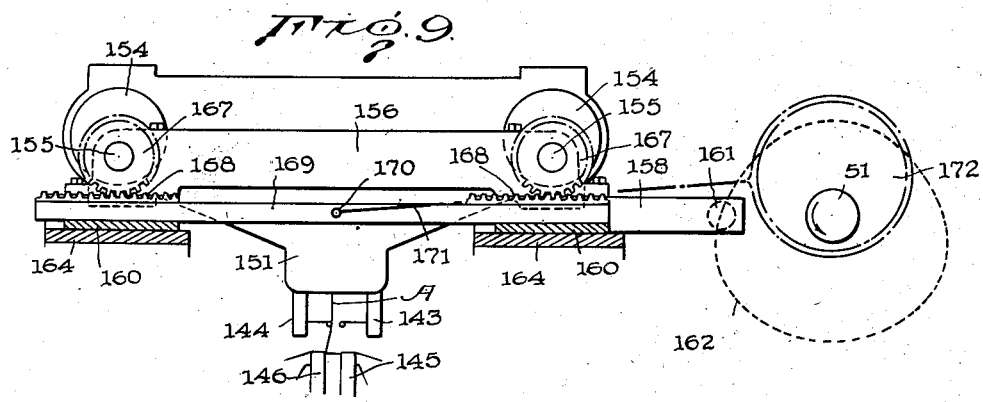
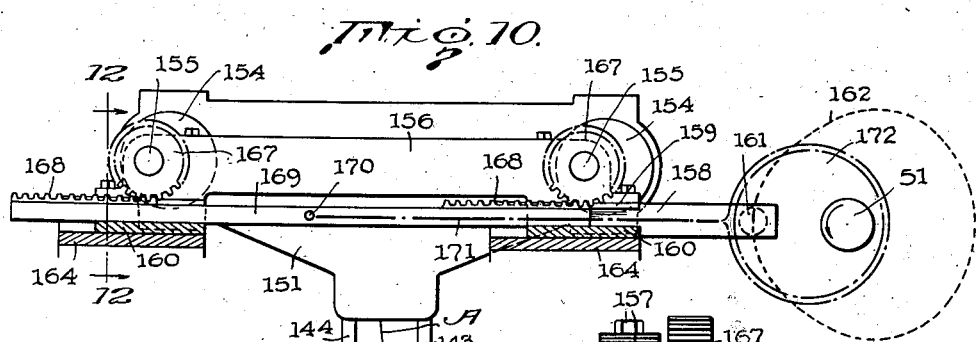
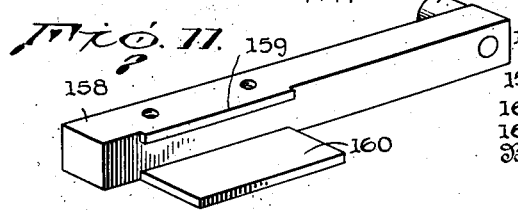
Inventor
PAUL S. SMITH,
By Church & Church
His Attorneys Nov. 24, 1942.    P. S. SMITH    2,302,722
APPARATUS FOR MAKING CEMENTED PILE FABRIC
Filed July 15, 1940    17 Sheets-Sheet 8
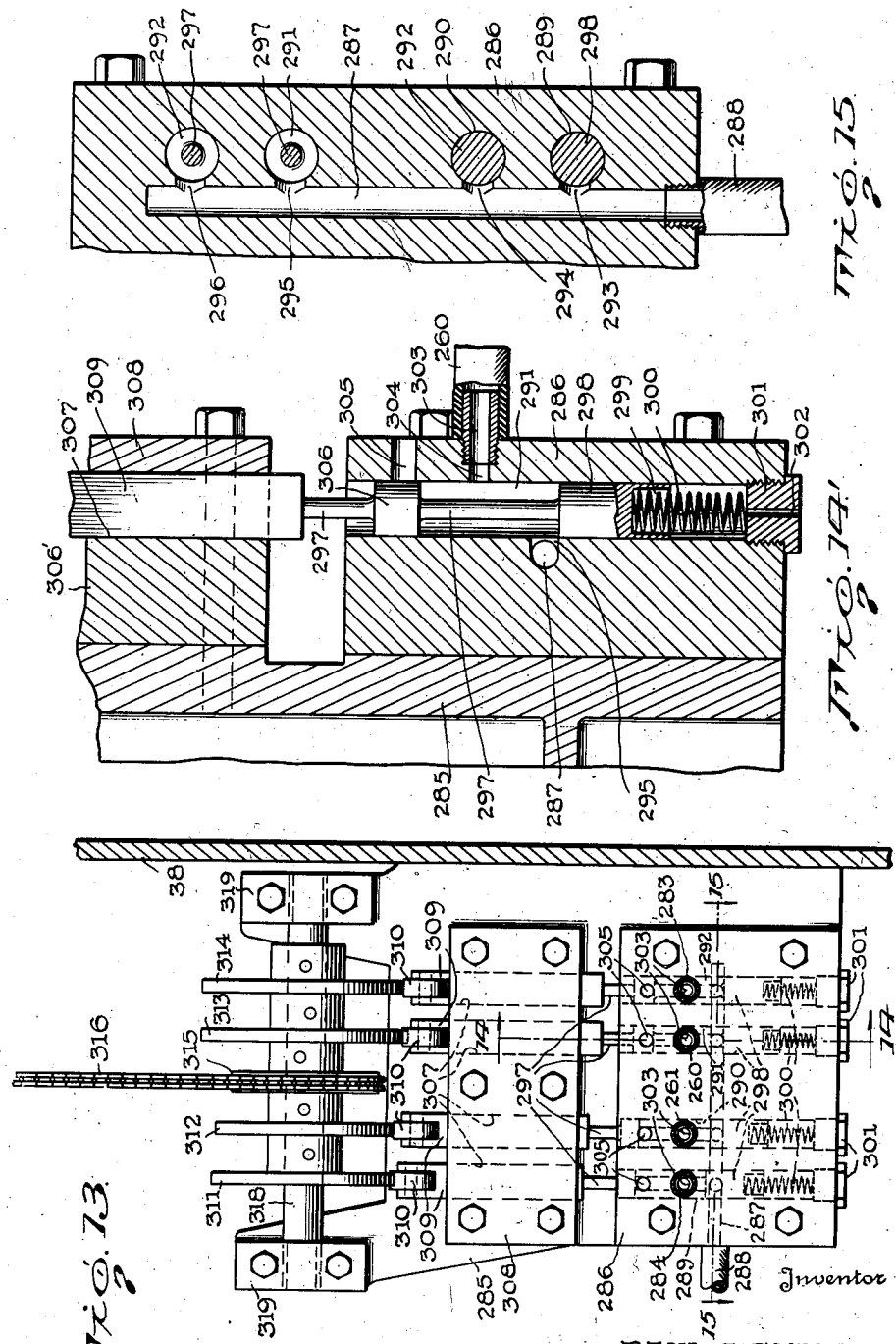
Inventor
PAUL S. SMITH,
By Church & Church
His Attorneys

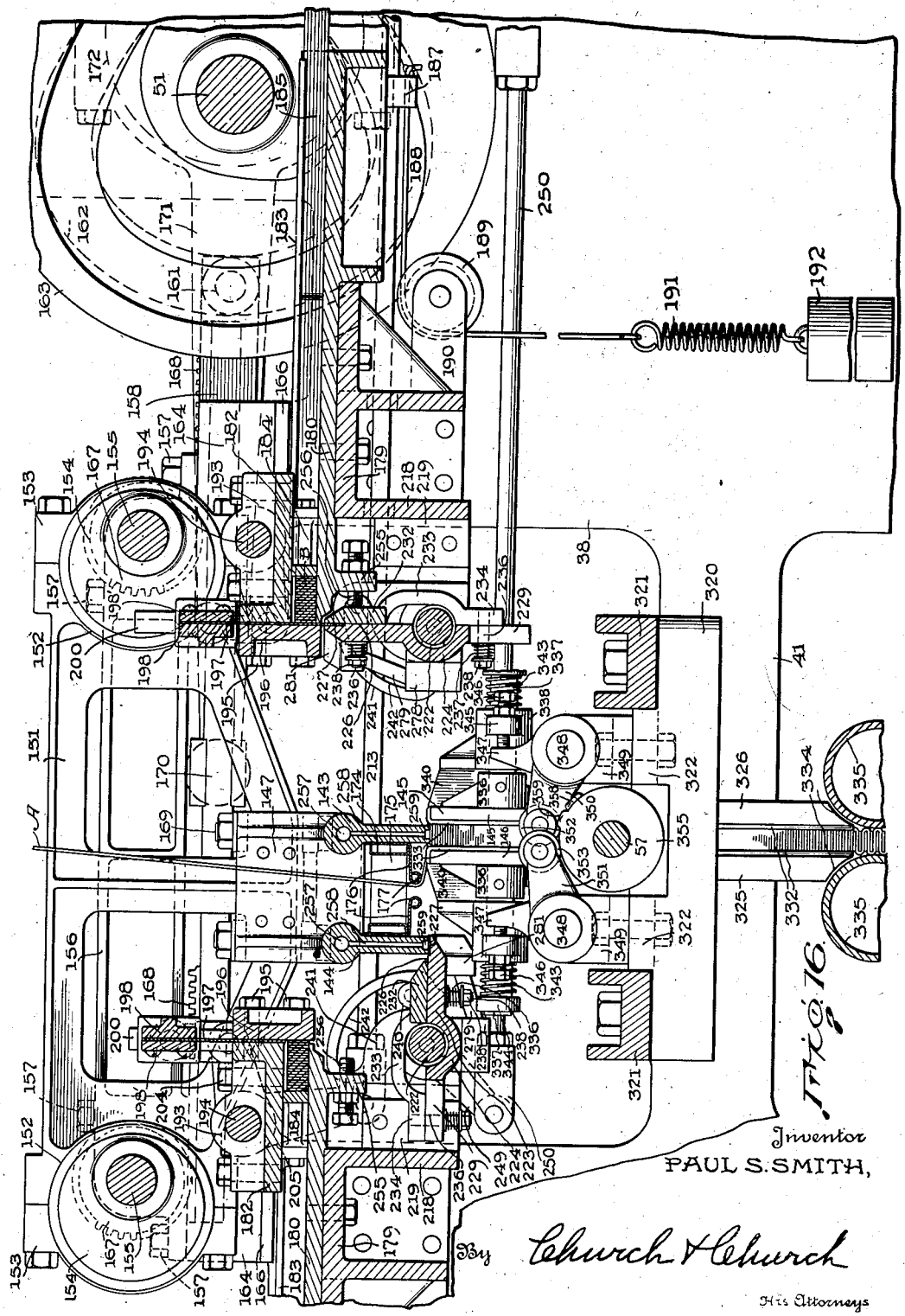

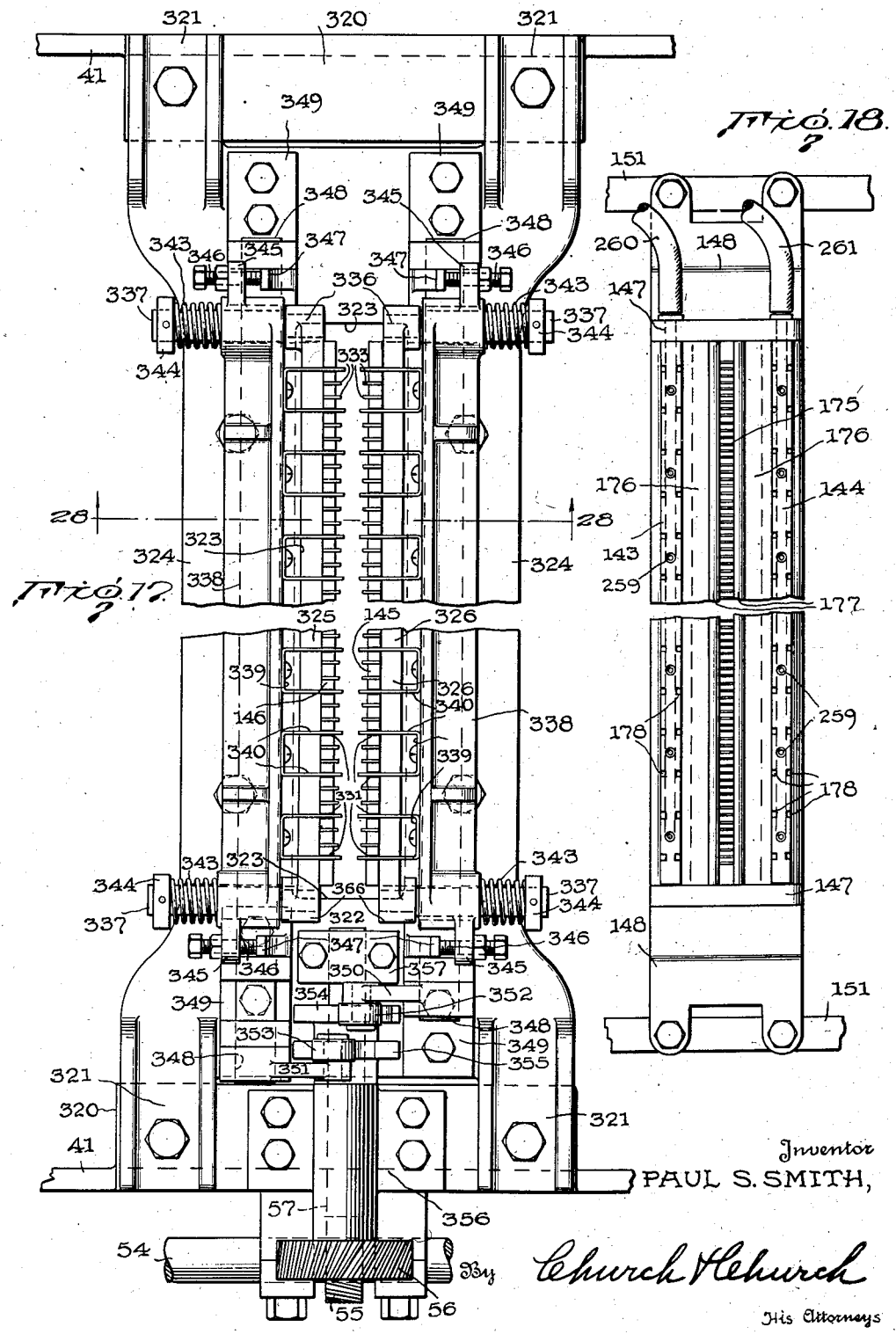

Nov. 24, 1942.  P. S. SMITH  2,302,722
APPARATUS FOR MAKING CEMENTED PILE FABRIC
Filed July 15, 1940   17 Sheets-Sheet 11
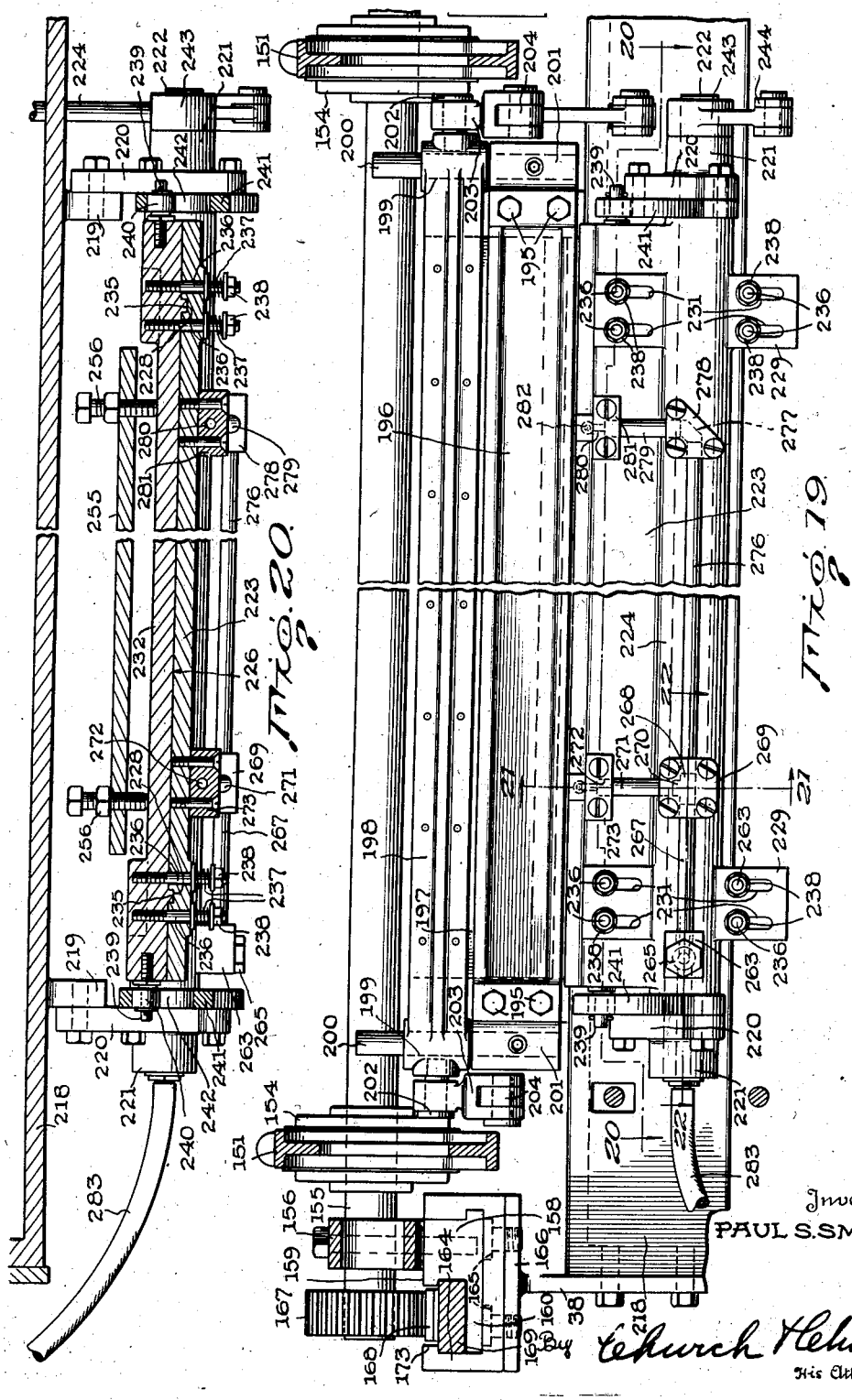
Inventor
PAUL S. SMITH,
By Church & Church
His Attorneys

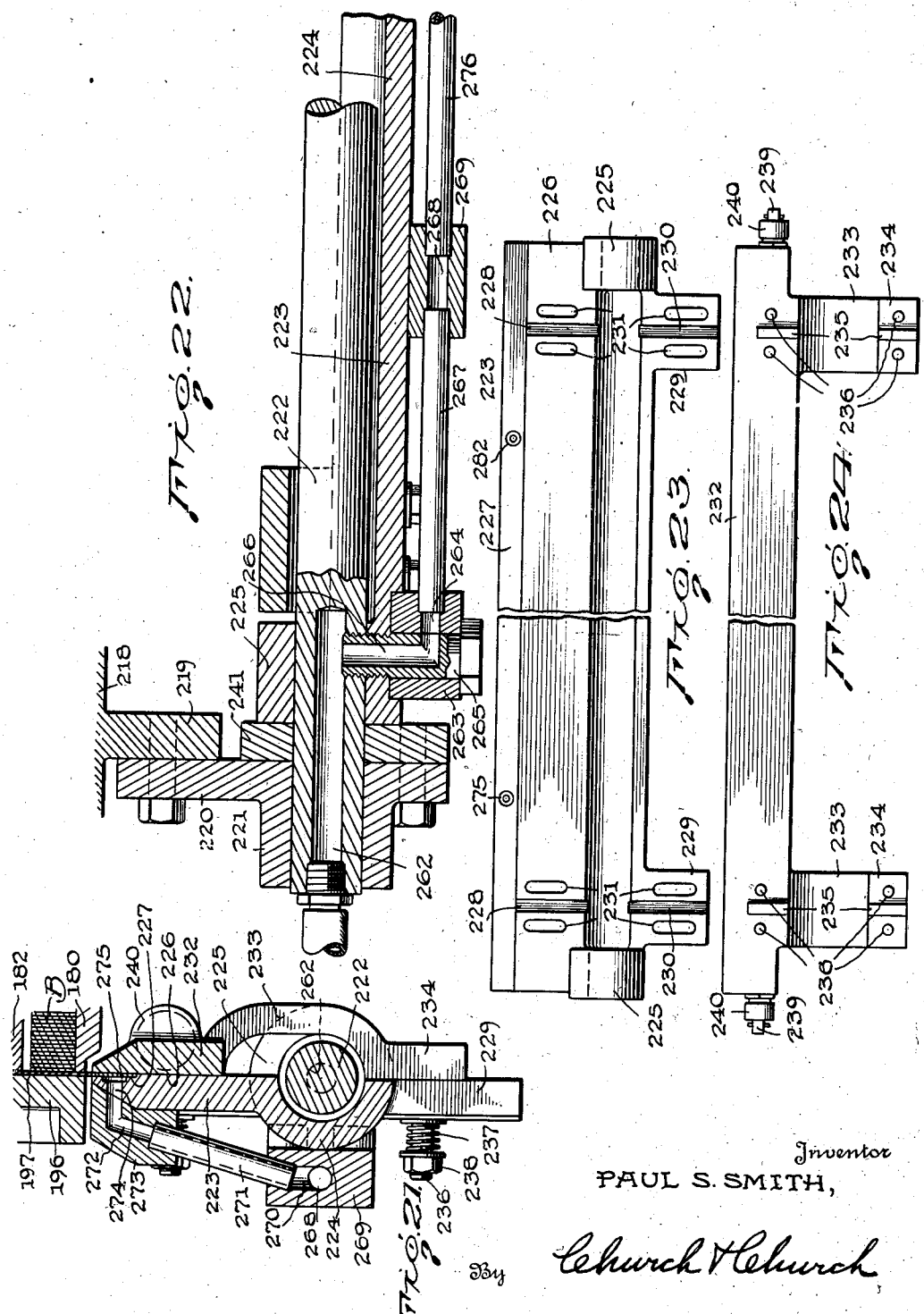

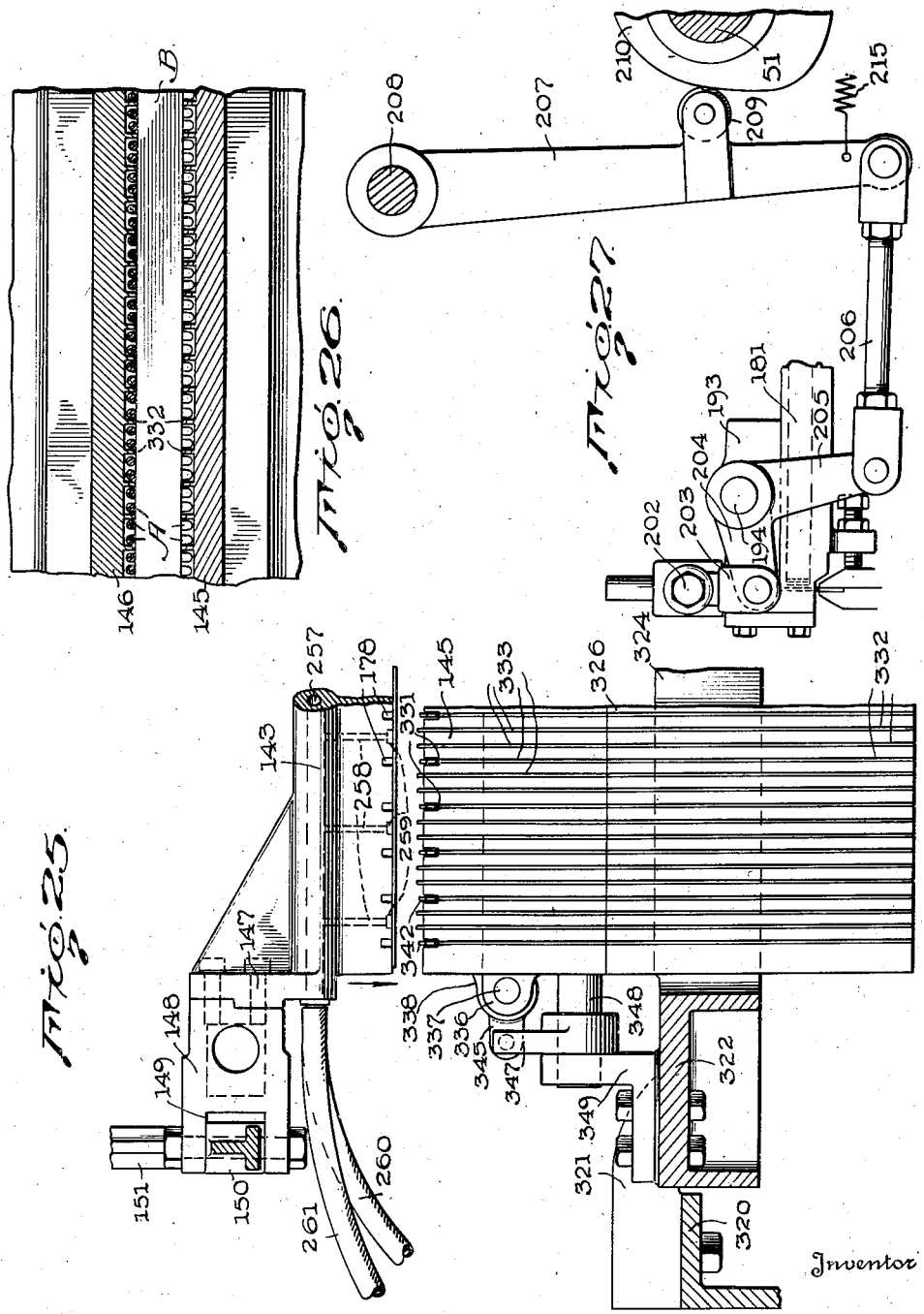

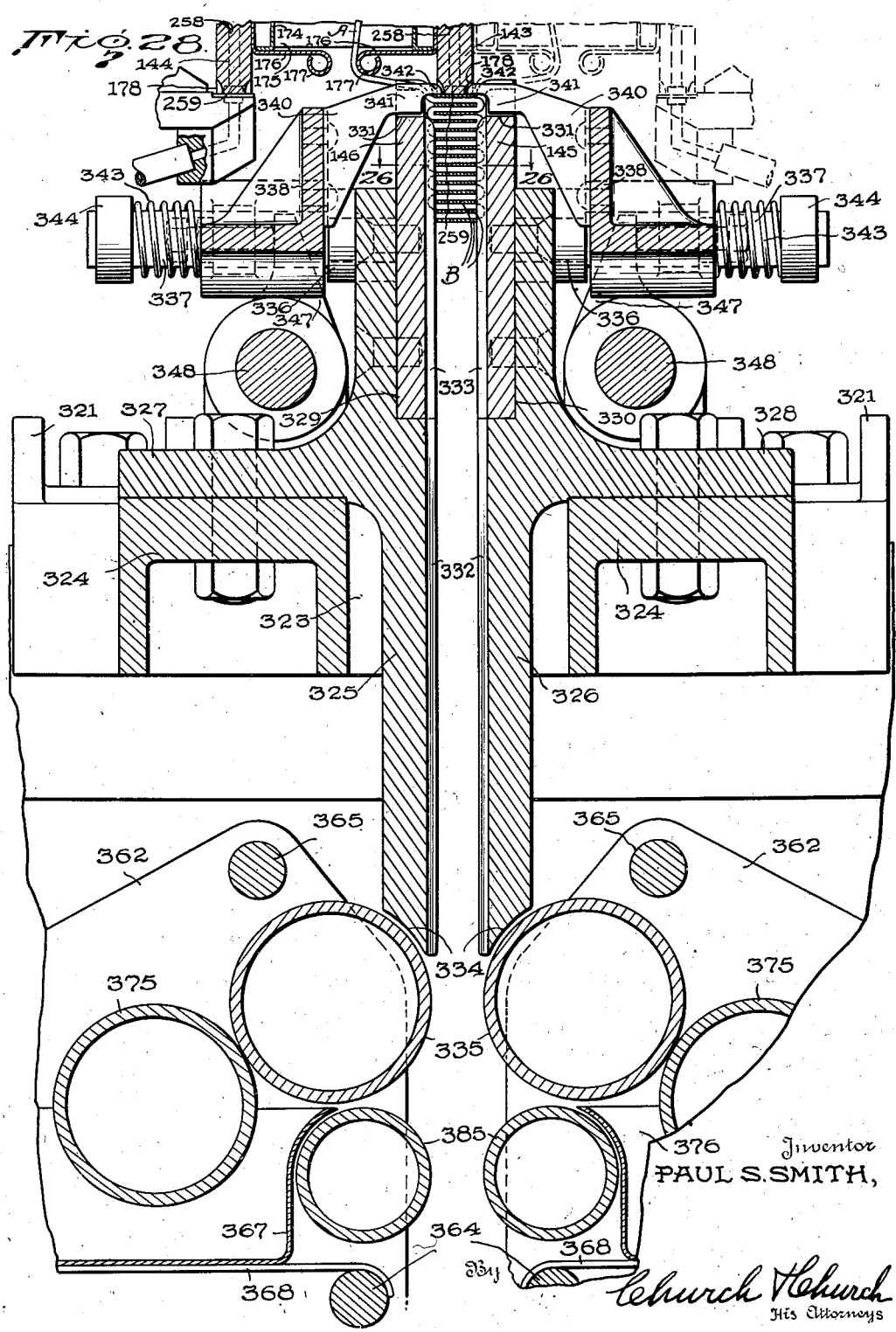

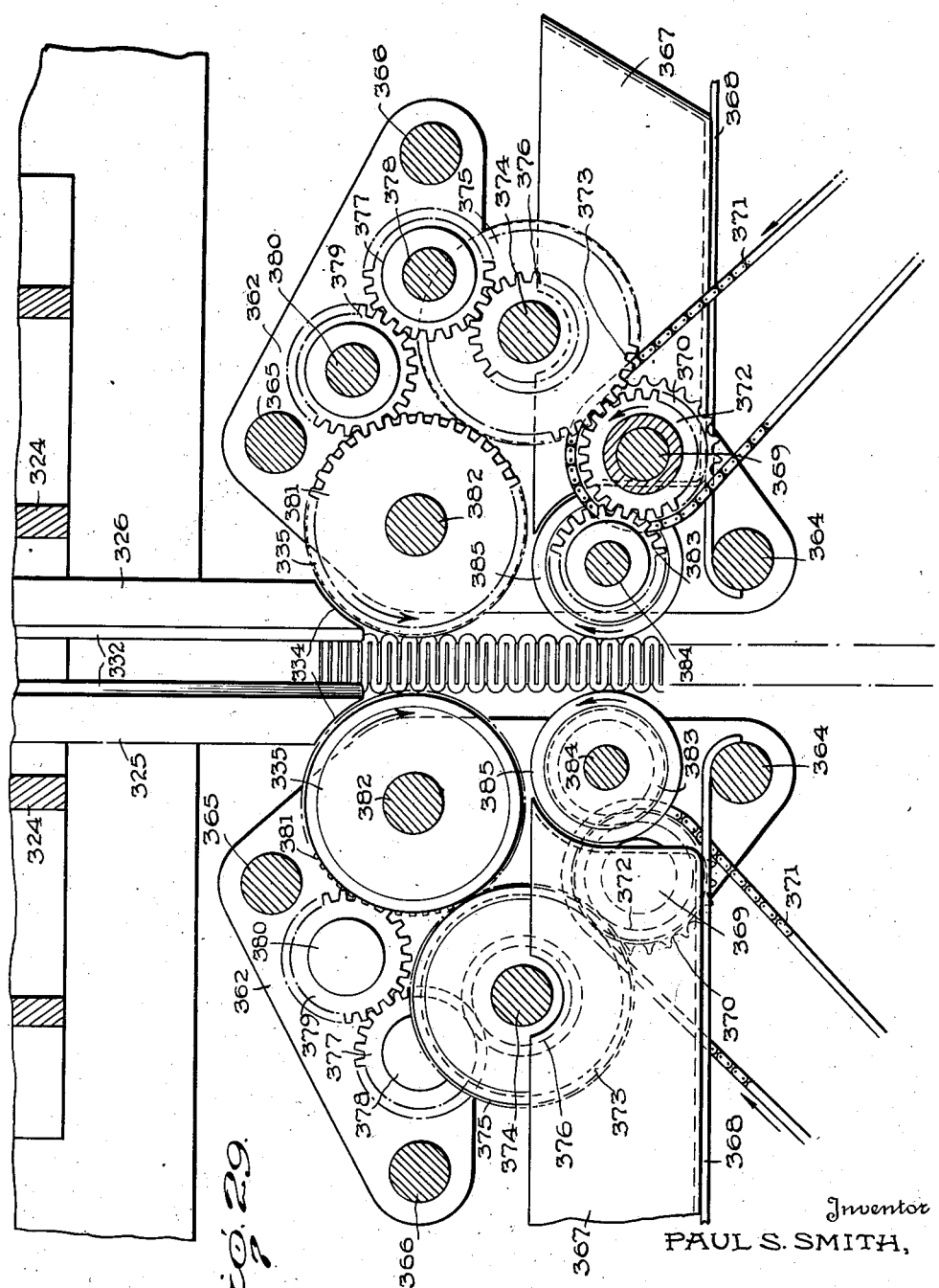

Nov. 24, 1942.　　　　　P. S. SMITH　　　　　2,302,722
APPARATUS FOR MAKING CEMENTED PILE FABRIC
Filed July 15, 1940　　　17 Sheets-Sheet 16
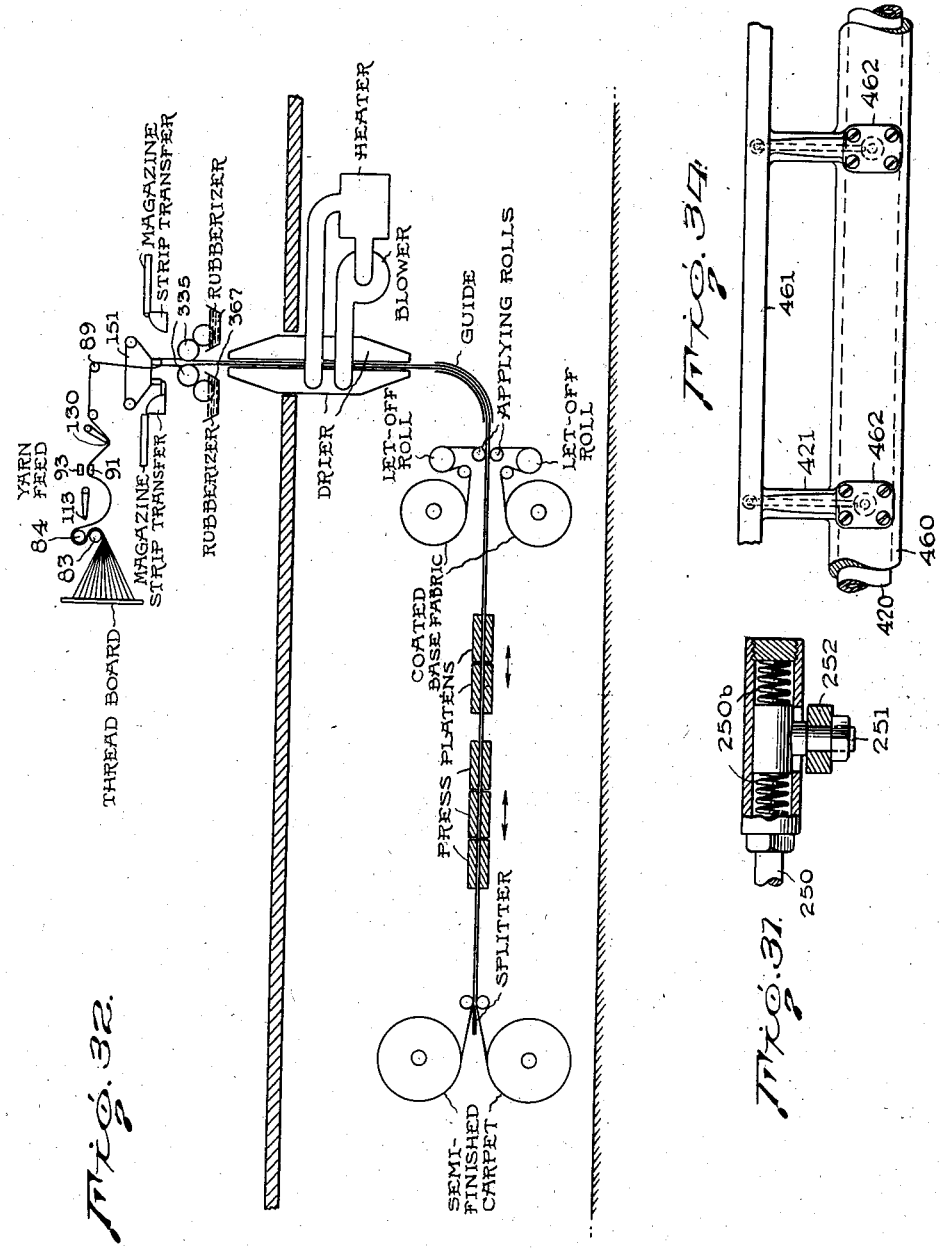
Inventor
PAUL S. SMITH,
By Church & Church
His Attorneys

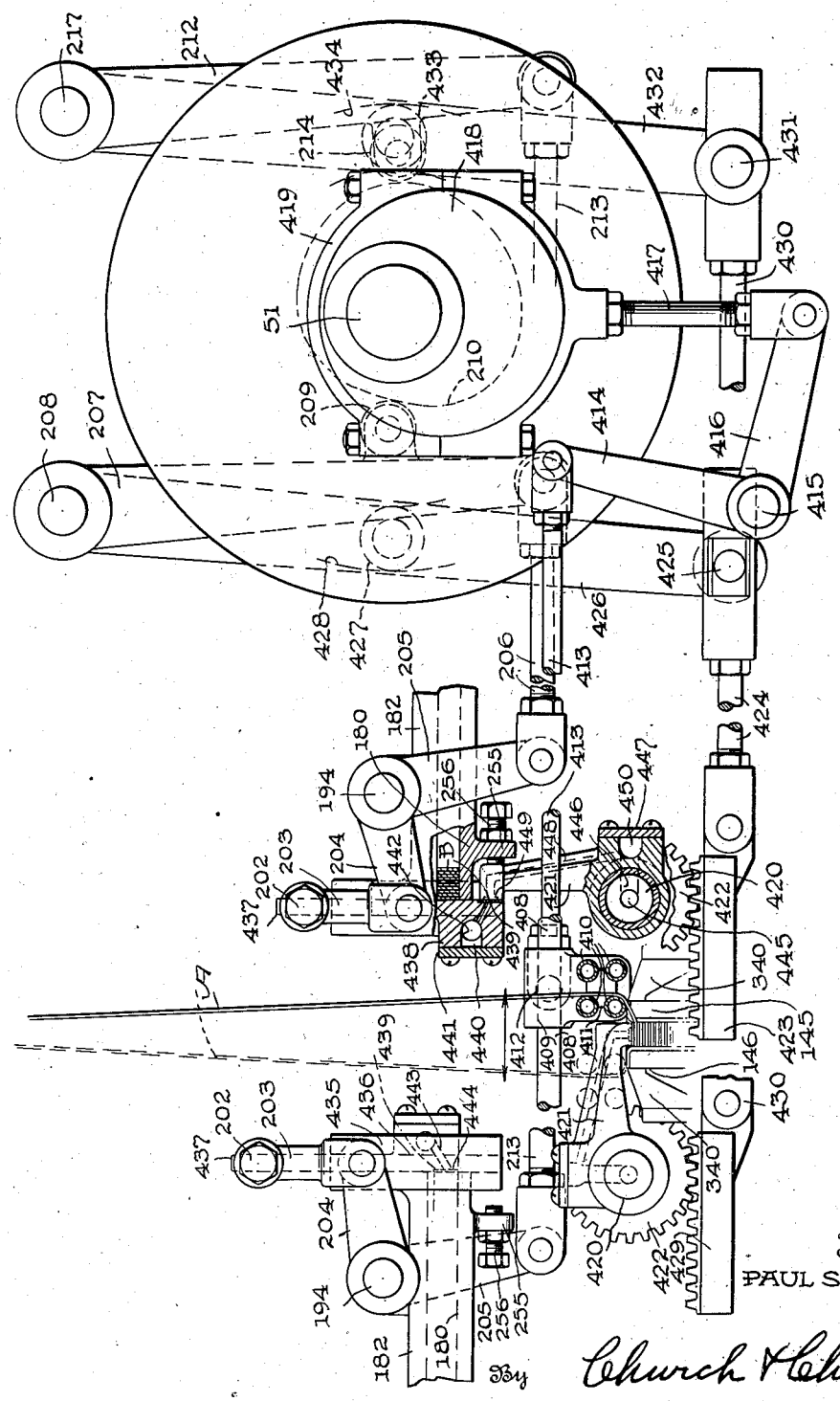

Patented Nov. 24, 1942

2,302,722

UNITED STATES PATENT OFFICE 2,302,722

APPARATUS FOR MAKING CEMENTED PILE FABRIC

Paul S. Smith, Cambridge, N. Y., assignor to Ralph S. Allen, Birmingham, Mich.; Dwight Porter Allen, administrator of said Ralph S. Allen, deceased Application July 15, 1940, Serial No. 345,448

38 Claims. (Cl. 154—1)

My invention relates to certain improvements in apparatus for the manufacture of cemented pile fabric, that is to say, apparatus for use in the manufacture of that type of pile fabric in which the fibers forming the pile are attached to a backing fabric by cementing material. My present invention relates to improvements upon the apparatus disclosed and claimed in United States Letters Patent, No. 2,050,740, patented to me on August 11, 1936, and the apparatus forming the subject-matter of my present invention is useful in carrying out the method disclosed and claimed in United States Letters Patent No. 2,051,010, also patented to me on August 11, 1936.

It has long been known that pile fabric may be manufactured by cementing the fibers forming the pile to a backing sheet, or fabric, and the usual practice has been to attach such fibers to the backing sheet in looped form with the loop portions of the pile fibers cemented to the backing sheet. Such fibers may be applied either in the form of yarn or as unspun fibers. The principal object of my present invention is to provide an improved apparatus by means of which such cemented pile fabric can be manufactured at a lower cost than is possible by apparatus heretofore proposed or used.

A further object of my invention is to provide an apparatus for producing cemented pile fabric automatically and continuously, which can be constructed at a much lower cost than machines for this purpose heretofore proposed or used, thus lowering the amount of capital necessarily invested in machines and equipment and thereby reducing the cost of production.

A further object of my invention is to provide an improved apparatus for producing a cemented pile fabric by means of which the speed of production can be greatly increased over machines and methods heretofore employed.

A further object of my invention is to provide an apparatus which will produce cemented pile fabric of improved character, the surface of which will be free of any ripple effect due to the machine on which it is made avoiding the appearance of "wire marks" characteristic of certain types of cemented pile fabrics.

A further object of my present invention is to provide a machine for making cemented pile fabric having a yarn-supplying or warp draw-off mechanism, which creates and maintains a slack supply of yarn or warp, so that the tension on the several yarns of the warp supplied to the plaiting mechanism will be a minimum corresponding only to the effort of drawing the yarns from the draw-off mechanism, thus entirely relieving the plaiting mechanism of the very considerable work of drawing the warp from a beam or creel, and resulting in a better product.

A further object of my present invention is to provide an improved apparatus for making cemented pile fabric, which includes means for feeding separator strips from a supply, means for transferring these strips one by one to the mouth of the confining passage in which a plaited structure is built up from separator strips and a warp, and means for plaiting the warp about the separator strips as they are deposited in said passage.

Another object of my invention is to provide an improved plaiting mechanism for plaiting the warp about the separator strips deposited in the mouth of the confining passage, which includes a warp guide, or reed, whereby the spacing of the individual yarns of the warp is maintained.

Another object of my present invention is to provide an apparatus which includes a plaiting frame having a pair of plaiting bars by means of which the separator strips are deposited one by one in the mouth of the confining passage in which the plaited structure is formed, together with improved means for actuating said plaiting frame so as to give the plaiting bars the necessary movement.

A further object of my invention is to provide a plaiting mechanism that may be actuated at higher speed than those known heretofore, inasmuch as the weight of the moving parts of such plaiting mechanism has been greatly reduced.

Another object of my present invention is to provide an apparatus for making cemented pile fabric which includes an improved device for feeding separator strips one by one from a supply, so that they may be transferred to, and deposited in, the mouth of the confining passage in which the plaited structure is to be formed.

A further object of my invention is to provide an apparatus for making cemented pile fabric having improved means for transferring the separator strips one by one from strip-receiving to strip-delivering position.

A further object of my present invention is to provide an apparatus for making cemented pile fabric which includes a confining passage in which a plaited structure is formed from separator strips and a warp plaited about them, and which includes improved means for retaining the strips in the mouth of said passage as they are deposited therein.

Another object of my invention is to provide an apparatus for making cemented pile fabric, including means forming a confining passage in which a plaited structure is formed from separator strips and a warp plaited about them, which passage is provided with means for maintaining the spacing of the individual yarns forming the warp, and, at the same time, for locating and maintaining the separator strips accurately in successive alignment in the plaited structure.

A further object of my invention is to provide, in an apparatus for making cemented pile fabric, an improved mechanism for applying cement to opposite faces of the plaited structure as it emerges from the confining passage in which it has been formed, by which the amount of cement applied may be readily and accurately controlled, by which such cement may be applied and substantially confined to those portions of the plaited structure where it is mechanically effective in binding the pile elements to the base fabric, and by which may be avoided such irregularities of distribution and penetration on the part of the applied cement as tend to produce irregularities of appearance in the finished product.

A further object of my invention is to provide, in an apparatus for making cemented pile fabric, means by which the initial cohesion between the cemented surface of the base fabric and the cemented surface of the plaited structure is made use of to fix and constantly maintain the number of "wires" or tuft loops desired per unit of length in the finished product.

Another object of my present invention is to provide an improved apparatus for making cemented pile fabric, which includes a plaiting mechanism having plaiting bars and strip-transfer mechanism, the plaiting bars and the strip-transfer mechanism having suction connections by means of which suction may be applied to hold a strip in place during its movement from the strip-feeding device to the mouth of the confining passage in which the plaited structure is formed, together with improved means for controlling the application of suction to such devices.

A further object of my invention is to provide a yarn-supplying mechanism, which I believe may be applicable to devices and apparatus other than that disclosed herein, by means of which yarn may be drawn from a source of supply and a slack supply of yarn created and maintained to feed the machine in which the yarn is used.

Further objects, and objects relating to details of construction and economies of manufacture, will definitely appear from the detailed description to follow. In one instance, I have accomplished the objects of my invention by the devices and means set forth in the following specification. My invention is clearly defined and pointed out in the appended claims. A structure constituting a preferred embodiment of the invention is illustrated in the accompanying drawings, forming a part of this specification, in which:

Figs. 1 and 1—A, taken together, are a view, in front elevation, of my improved machine for making cemented pile fabrics.

Fig. 2 is a view, in rear elevation, of the plaiting section of the machine.

Fig. 3 is a view of the plaiting section of the machine, taken on the line 3—3 of Fig. 1.

Fig. 4 is a top plan view of the yarn-supplying mechanism.

Fig. 5 is a detail, sectional view, taken on the line 5—5 of Fig. 4.

Fig. 6 is a vertical, sectional view, on an enlarged scale, through the yarn-supplying mechanism.

Fig. 7 is a detail view, in vertical section, illustrating one of the actuating cams and its connections to one of the loop-forming devices of the yarn-supplying mechanism.

Figs. 8, 9 and 10, are detail views, partly in vertical section and partly diagrammatic, illustrating the means for moving the plaiting frame, at various stages in the cycle of operation.

Fig. 11 is a perspective view of one of the cam-actuated slides used in the plaiting mechanism.

Fig. 12 is a detail, sectional view, taken on the line 12—12 of Fig. 10.

Fig. 13 is a vertical, sectional view, taken on the line 13—13 of Fig. 2, and illustrating the cam-actuated valve mechanism for controlling the application of suction to various parts of the plaiting mechanism.

Fig. 14 is a detail, sectional view, taken on the line 14—14 of Fig. 13.

Fig. 15 is a detail, sectional view, taken on the line 15—15 of Fig. 13.

Fig. 16 is a vertical, sectional view through the plaiting mechanism.

Fig. 17 is a top plan view, taken on the line 17—17 of Fig. 1, and illustrating the mouth of the confining passage in which the plainted structure is formed, together with the means for retaining the separator strips as they are deposited in said passage.

Fig. 18 is a bottom plan view of the plaiting frame for delivering separator strips to and depositing them in the mouth of said confining passage.

Fig. 19 is a vertical, sectional view, taken on the line 19—19 of Fig. 1, and illustrating one of the strip-feeding devices and its cooperating strip-transfer device for removing an individual separator strip from a supply and presenting it to the plaiting frame for the purpose of delivery to the mouth of the confining passage.

Fig. 20 is a horizontal, sectional view, taken on the line 20—20 of Fig. 19.

Fig. 21 is a vertical, sectional view, taken on the line 21—21 of Fig. 19.

Fig. 22 is a detail, sectional view, taken on the line 22—22 of Fig. 19.

Fig. 23 is a view, in side elevation, of the main jaw member of one of the strip-transfer devices.

Fig. 24 is a view, in side elevation, of the secondary jaw member of said device.

Fig. 25 is a fragmentary view, partly in vertical section and partly in side elevation, illustrating one of the plates forming the confining passage for the plaited structure and one of the plaiting bars for delivering separator strips thereto.

Fig. 26 is a horizontal, sectional view, taken on the line 26—26 of Fig. 28.

Fig. 27 is a detail, vertical, sectional view illustrating the cam-actuated connections for operating the strip-feeding device.

Fig. 28 is a vertical, sectional view, taken on the line 28—28 of Fig. 17.

Fig. 29 is a vertical, sectional view, illustrating the mechanism, shown in the lower central portions of Figs. 1 and 28, for applying an adhesive cement to opposite surfaces of the plaited structure.

Fig. 30 is a detail, sectional view, taken on the line 30—30 of Fig. 1—A.

Fig. 31 is a detail, sectional view, taken on the line 31—31 of Fig. 1.

Fig. 32 is a diagrammatic view illustrating the relation of the apparatus of my present invention to other equipment used in the manufacture of cemented pile fabric.

Fig. 33 is a view, partly in side elevation and partly in vertical section, corresponding in general to Fig. 16, but illustrating a modified form of plaiting mechanism, and Fig. 34 is a fragmentary view in side elevation of one set of strip-transfer arms shown in Fig. 33.

The improved apparatus forming the subject-matter of my present invention is for use in carrying out the method of making cemented pile fabric which comprises plaiting either a warp of spun yarns, or a web or bat of unspun fibers, about a series of separator strips, so that the warp will pass around the edge of one strip, over that strip, and around the opposite edge of the strip next above it, over the face of that strip and around the opposite edge of the one next above it, and so on, thus folding the fibrous warp alternately about the spaced separator strips. The function of these separator strips is to hold the fibers in proper relation to each other while they are cemented to a backing sheet, or sheets, and, in order to facilitate the removal of these separator strips at a certain stage in manufacture, they should be formed of a material which can be severed readily. The plaited structure, comprising these severable separator strips and the fibers plaited about them, is formed in a confining passage and, as it emerges from this passage, a cementing material is applied to opposite faces thereof. This cementing material is then dried, and webs of cemented base fabric are applied to opposite faces of the plaited structure and vulcanized thereto, after which the plaited structure is split longitudinally, giving two identical webs of cemented pile fabric, each of which may be subjected to a beating operation for the purpose of removing any remaining pieces of the separator strips, a combing or tigering operation to arrange the pile fibers in substantial parallelism, and a final shearing operation by which such fibers are cut to give a pile of the desired depth.

The machine includes a pair of spaced plates defining a passage in which the plaited structure is formed, confined, and advanced. One feature of my present invention consists in providing means for feeding separator strips, one by one, from suitable magazines and delivering said strips to transfer devices, means for actuating the transfer devices to transfer the strips so delivered to strip-delivering positions, and means for taking the strips so delivered and depositing them, one by one, in the mouth of the confining passage, at the same time plaiting a warp of spun yarns, or a web or bat of unspun fibers, about the separator strips to form the plaited structure.

I have found it highly desirable that the warp of yarns should be fed to the plaiting mechanism in a slack condition. To accomplish this I have provided a warp draw-off, or yarn-supplying, mechanism, which performs the work of drawing the yarn or warp from a creel or beam, and, at the same time, creates and maintains a slack supply from which the plaiting mechanism draws. This mechanism comprises a clamping device, through which the warp passes, and which is opened and closed to release and grip the yarn. I provide two loop-forming devices, one operating in advance of the clamping device, and the other on the other side thereof. The operation of these loop-forming devices is so timed with relation to the operation of the clamping device, that, when the clamping device is closed, the loop-forming device in advance thereof operates to draw yarn from a source of supply and form a loop of slack yarn or warp in advance of the clamping device.

The operation of the second loop-forming device is so timed that, when the clamp is opened, it will draw through the clamp warp or yarn from the loop previously formed by the first loop-forming device, so as to create a loop or slack supply of yarn from which the plaiting mechanism draws as needed. The plaiting mechanism thus operates at all times on a warp consisting of individually slack yarns.

My preferred form of plaiting mechanism consists of a plaiting frame carrying a pair of parallel plaiting bars. This plaiting frame is moved to and fro, in a semi-elliptical path, so that the plaiting bars are alternately effective to take up a separator strip and carry it to, and deposit it in, the mouth of the confining passage in which the plaited structure is to be formed. I find it desirable, when using a warp of yarns, to provide a reed, or warp guide, through which the individual yarns of the warp run. This warp guide may well be mounted between the plaiting bars, and comprises partitions, which separate the individual yarns of the warp so as to maintain their lateral spacing, and parts having rounded or smooth edges, which bear against the yarns of the warp to plait them about the severable separator strips as they are deposited. To give the plaiting frame the required movement, I provide a pair of shafts, which are journaled in slidable bars and carry eccentrics bearing on the plaiting frame, and the eccentric shafts are rotated while the slidable bars in which the shafts are journaled are reciprocated, so that, as a result of these two actions, the lower edges of the plaiting bars trace semi-elliptical paths.

In order to provide a plaiting mechanism which will operate at high speed without involving large unbalanced forces, I have found it desirable to cut down the weight of the moving parts. To that end, I have proposed to provide transfer arms to which strips are successively fed from a strip supply, and which transfer the strips to, and deposit them in, the mouth of the confining passage, while a warp guide is reciprocated across the mouth of said passage to plait the warp about the strips so deposited.

Referring to the numbered parts of the drawings, upon the base 35, which is provided with a central opening 36, through which the plaited structure passes to the vulcanizer, there are mounted two side members 37 and 38. Each of these side members consists of a pair of vertical pillars connected by cross-members, as at 39 and 41. The side members, 37 and 38, are tied together by the base 35, and by various cross-members, as will be pointed out hereinafter. Mounted upon the upper ends of the pillars of side members 37 and 38, are transverse yokes 42 and 43, which tie said side members together. Secured to the tops of yokes 42 and 43 are the horizontal, parallel rails 44, which support the yarn-supplying mechanism.

The power for operating the machine is transmitted to it by the main drive shaft 45, which has a bevel gear 46 secured to one end thereof, meshing with a bevel gear 47 upon the vertical shaft 48. On the upper end of shaft 48, there is a bevel pinion 49 meshing with the bevel gear 50, which is secured to the shaft 51 for operating the plaiting mechanism, whereby that shaft is driven. Secured to shaft 48 is a spiral gear 52 meshing with a spiral pinion 53 on a cross-shaft 54. Shaft 54 carries another spiral pinion 55 meshing with a spiral gear 56 secured to retaining finger release shaft 57, whereby shaft 57 is driven. A worm 58 is also secured to shaft 54 and meshes with a worm gear 59 secured to yarn-supplying cam shaft 60, whereby that shaft is driven to actuate the cams for the yarn-supplying mechanism.

A spiral gear 61, fast on shaft 48, meshes with a spiral gear 62 fast on a transverse shaft 63. The latter has secured thereto two spiral pinions 64 and 65, which mesh with spiral gears 66 and 67 fast on the stub shafts 68 and 69, respectively. These shafts drive the mechanism by which cement is applied to opposite faces of the plaited structure as it emerges from the confining passage in which it is formed.

A worm 70, fast on the lower end of shaft 48, meshes with worm gear 71 fast on a shaft 72 journaled in suitable bearings on the frame member 37. A pinion 73, fast on shaft 72, meshes with an idler pinion 74, which, in turn, meshes with pinion 75 fast on the end of the transverse shaft 76. Worms 77 and 78, fast on shaft 76, mesh with worm gears 79 and 80, which are fast on the shafts 81 and 82. These control the mechanism for applying cemented base fabric to opposite faces of the plaited structure.

As indicated above, I have provided a yarn-supplying, or warp draw-off, mechanism, which creates and maintains a slack supply of warp or yarn for feeding the plaiting mechanism. This yarn-supplying mechanism comprises a pair of tension rolls 83, 84, each having trunnions 85, 86, at opposite ends, which rest in vertical slots 87 of brackets 88 secured to the rails 44. The yarns going to make up the warp A come from a suitable source of supply, and pass underneath the lower tension roll 83, thence up and between the tension rolls 83 and 84, and over the top roll 84 to the yarn-supplying mechanism. A guide roll 89 is also provided, journaled in brackets 90 mounted on the rails 44, and located substantially vertically above the mouth of the confining passage in which the plaited structure is to be formed. The warp A passes over the guide roll 89, thence through the plaiting mechanism to the mouth of the confining passage, and, as the plaited structure is formed about the strips in the mouth of said passage, the warp is drawn from the slack supply created and maintained by the yarn-supplying mechanism in advance of the guide roll 89.

The yarn-supplying mechanism includes a clamping device through which the warp passes, which clamping device is adapted to be closed to grip the yarns of the warp, and opened to release them. This clamping device includes a lower clamping bar 91 secured to, and extending transversely between, the rails 44. Vertical studs 92 are screwed into the ends of bar 91, and the channel member 93, forming the upper member of the clamping device, is slidably mounted on the studs 92, having sleeves 94 secured thereto which are slidable on the studs 92. Compression springs 95 surround the sleeves 94 and are compressed between the base of channel member 93 and nuts screwed on the upper ends of studs 92. These springs normally bring the upper member 93 of the clamping device into clamping engagement with the bar 91 thereof. A bar 96 is secured to the bottom of member 93 by screws 97, and is enveloped in a sheet 98 of suitable material, such as emery-cloth, so as to provide a surface which will grip well upon the yarns of the warp passing through the clamping device.

At each end of the clamping device there is a lever 99 pivoted, at 100, in a bracket 101 mounted on the corresponding rail 44. Each of these levers is pivotally connected by a pin 102 with the adjacent end of the upper clamping member 93. The outer end of each lever 99 is pivotally connected, at 103, with the upper end of a link 104, the lower end of which is pivoted to a rocker arm 105 journaled on shaft 106, which is carried by, and extends between, the frame members 37 and 38. Each rocker arm 105 carries a roller 105' engaging an edge cam 107 fast on the cam shaft 60.

Fixed in brackets 108 secured to the side of the upper clamping bar 93 are pins 109, which extend downwardly alongside the lower clamping bar 91, and are so located as to serve as edge guides for the warp of yarns passing through the clamping device.

The first loop-forming bail is located between the rollers 83, 84 and the clamping device, and the warp of yarns, as it leaves said rollers, passes beneath the said bail, and thence between the lower clamping bar 91 and the upper clamping bar 93. A shaft 110 is journaled in brackets 111 mounted on the side rails 44. The arms 112 of the bail are secured to shaft 110 and support the roller bail 113, which extends above the warp of yarns, as shown in Fig. 4. Operating arms 114, one at each side, are secured to shaft 110, and these arms are pivotally connected to the upper ends of links 115, the lower ends of which are pivoted to rockers 116 journaled on shaft 106. Each rocker carries a roller 117, which engages the edge of a corresponding cam 118 fixed on cam shaft 60. It will be noted that the shape of cams 118 is such that there is a comparatively slow rise from the low to the high spot of the cam, and a quicker return from said high spot to the low spot. Thus, as the cam rotates in the direction of the arrow indicated in Fig. 1, the links 115 are raised rather slowly, thus slowly rocking the bail 113 upward. The bail is maintained in its upper position by the high surfaces of the cams, which occupy about one-third of the cam peripheries. The shape of the cams is such that the bail is returned more rapidly from its high position to the low position illustrated in Fig. 6.

Spring connections are provided which tend to rock the first loop-forming bail into the lower, loop-forming position shown in Fig. 6. These spring connections comprise sectors 119, fixed to shaft 110, to which the upper ends of cables 121 are connected at 120. The lower ends of these cables are connected to tension springs 122, which, in turn, are connected to the upper ends of cables 123, the lower ends of which are fastened to rings 124 in the base 35, as shown in Fig. 1—A.

Guide fingers 125 having their rear ends bent back upon themselves are secured, as at 126, to the bail arms 112, as shown in Figs. 4 and 6, and serve as edge guides for the warp passing under the bail.

The second loop-forming bail is located between the clamping device and the guide roller 89, and the warp of yarns A, as it leaves the clamping device, passes under said bail, and thence over the roller 89 to the plaiting mechanism. Shaft 127 is journaled in brackets 128 secured to the side rails 44. The arms 129 of the second loop-forming bail are secured to shaft 127, and support the roller bail 130 under which the warp of yarns passes. An operating arm 131 is secured to shaft 127 adjacent one of the side rails 44, and the lower end of this arm is connected to the upper end of a link 132, the lower end of which is connected at 141 to one arm 133 of a two-armed lever pivoted on shaft 134. The other arm 135 of this lever is connected to the upper end of a link 136, the lower end of which is pivotally connected to a rocker arm 137 journaled on shaft 106. Rocker arm 137 carries a roller 138, which engages the edge of a cam 139 fast on the cam shaft 60. Consideration of the shape of cam 139 will show that, as cam shaft 60 revolves, the second loop-forming bail is gradually lowered from the position shown in Fig. 1 to its lowermost position, drawing the warp of yarns through the clamping device, which is at that time opened, and that then the roller bail is as gradually returned to its upper position. A spring 140, connected at one end to the pin 141 and, at the other end, to a bracket 142 on the side rail 44, tends to move the bail 130 to the lower position, and to hold roller 138 in contact with the edge of cam 139.

Referring to Fig. 6, a consideration of the contour of the clamp-operating cam 107 will show that the clamp remains open during about two-thirds of the cycle. Considering the contour of the cam 118, which operates the first loop-forming bail 113, it will be apparent that the bail moves upward slowly during about one-half of the cycle, dwells in its uppermost position during the ensuing one-third, and falls rapidly during the remaining one-sixth. Consideration of the relative timing of these two cams will show that the clamp remains closed during the downward, loop-forming movement of the bail 113, and remains open during its upward movement and dwell.

Referring to Figs. 6 and 7, and regarding one revolution of the cams 107, 118, and 139 as constituting a cycle of the draw-off mechanism, it will be noted that, in the position shown in Fig. 6, the bail 113 is in its lowest position, having completed the formation of a loop of warp, and that the clamp is closed. Further revolution of the cams 107 and 118 will cause the clamp to open and to remain open during about two-thirds of the cycle, while, at the same time, the bail 113 will rise gradually and dwell in its uppermost position during about five-sixth of the cycle. During this period the major portion of the loop of warp thus formed may be drawn through the open clamp by the operation of the second loop-forming bail 130, and by the action of the plaiting mechanism. When the cam 118 has completed about five-sixths of a revolution from the position shown in Fig. 6, the cam 107 will have reached such a position as to have just closed the clamp, whereupon further rotation of the cam 118 permits the bail 113 to descend rapidly to the position shown, forming a new loop in the warp, and completing the cycle.

Referring now to Fig. 7, it will be noted that the cam 139 has two symmetrical lobes, and is thus adapted to produce uniform movement of the arms 129 of the second loop-forming bail 130 from the position shown in Fig. 6 downward to a position substantially at right angles thereto, and similarly to return them to their original position, thus forming a loop of warp between the clamp and the roller 89. The cam 139 in Fig. 7 is shown substantially in timed relationship with cams 107 and 118 in Fig. 6. From the position shown, a slight further rotation of the shaft 60 will cause the cam 107 to open the clamp, while the cam 118 will begin to lift the bail 113 from the loop it has just formed. At the same time the cam 139 will have raised the bail 130 to its highest position, from which it will immediately commence to descend, drawing slack warp through the clamp to form a loop between the clamp and the roller 89, while, simultaneously, the plaiting mechanism draws the required slack warp from the loop released by the rising bail 113 through the open clamp and under the descending bail 130. Shortly prior to the closing of the clamp, the bail 130 will have completed its downward movement and started to rise, which it will continue to do throughout the remainder of the cycle, while the plaiting mechanism supplies itself from the loop of slack warp previously formed by the descent of the bail.

It will be obvious that the bail 113 must be capable of forming a loop containing slightly more warp than is required by the plaiting mechanism during one cycle of the draw-off mechanism, and that the bail 130 must be capable of forming a loop containing slightly more warp than is required by the plaiting mechanism during the period when the clamp is closed. Under these conditions the draw-off device is inherently and automatically self-compensating, in that there will always be slack yarn available for the plaiting mechanism, and yet, in the long run, only the exact amount of warp required for an indefinite series of plaiting operations will be withdrawn from the source of supply.

The plaiting mechanism, by which severable separator strips are successively delivered to the mouth of a confining passage, and by which the warp of yarns is plaited about said strips in the mouth of said passage, comprises a plaiting frame, which supports a pair of spaced, parallel, plaiting bars 143 and 144, Figs. 1, 8, 9, and 10. The upper end of the confining passage, in which the plaited structure is formed by the plaiting of the warp A about the separator strips B, is defined by the plates 145 and 146. The plaiting frame is given a movement in a semi-elliptical path, so that first one, and then the other, of the plaiting bars is caused to enter slightly the mouth of the passage defined by the plates 145 and 146. As shown in Fig. 8, the plaiting bar 143 is entered slightly into the mouth of said passage. As the shaft 51 turns through 90° in the direction of the arrow indicated on Fig. 8, the plaiting frame is moved upwardly and to the right from the position shown in Fig. 8 to that shown in Fig. 9 by mechanism that will be later described. During the next 90° of movement of shaft 51, the plaiting frame continues its movement downwardly and to the right to the position shown in Fig. 10, in which the plaiting bar 144 is entered slightly into the mouth of the passage formed by the plates 145 and 146. During the next 90° of movement of shaft 51, the plaiting frame moves upwardly and to the left from the position shown in Fig. 10 to that shown in Fig. 9, and, during the next 90° of movement of said shaft, the plaiting frame continues its movement to the left and downwardly, to the position shown in Fig. 8, in which the plaiting bar 143 has again entered slightly into the mouth of the passage formed by the plates 145 and 146. As will be described hereinafter more fully, the plaiting bars 143 and 144 take separator strips from strip-transfer devices, one at each side, and deposit said strips, one by one, in the mouth of the passage formed by the plates 145 and 146, and, at the same time, plait the warp A about the strip last deposited in the mouth of said passage. As shown in Figs. 16, 18 and 25, the plaiting bars 143, 144 are integrally connected by the end flanges 147, each of which is bolted to a member 148 having a jaw portion 149, which engages seats 150 on a side member 151 of the plaiting frame, and is bolted thereto.

To impart to the plaiting frame the motion necessary to cause the plaiting bars to travel in the semi-elliptical paths heretofore described, each side member 151 has, at each end, a semi-circular recess 152, and a cap member 153 bolted thereto provided with a similar recess, which recesses receive eccentrics 154 fast to the transverse shafts 155. The transverse shafts 155 are rotatably mounted in the ends of journal bars 156, one of which is provided at each side of the machine. Each bar 156 is secured by bolts 157 to a pair of slides 158 (see Figs. 8, 9 and 10). Each of these slides has a laterally projecting upper flange 159, and a laterally projecting lower ledge 160, as shown in Figs. 11 and 12. The slide secured to the end of the journal bar remote from cam shaft 51, is shown in cross-section in Fig. 12. The slide secured to the other end of the journal bar is somewhat longer and, as shown in Fig. 11, has a laterally projecting pin carrying a cam-roller 161, which engages in the cam race 162 of the double box cam 163 fast on cam shaft 51. Each pair of slides 158 is slidably mounted in a guide-way 164 secured by screws 165 to seats 166 formed on the side frame members 37 and 38 of the machine. Pinions 167 are secured on each end of each of the transverse shafts 155, and mesh with rack portions 168 on slides 169. The rack slides 169 are slidably mounted on the ledges 160 of slides 158, as shown in Fig. 12, and are held against vertical movement with respect thereto by flanges 159 on slides 158, and by the overhanging lips 173 on the guide members 164. Each rack slide 169, adjacent its midpoint, carries a connecting pin 170 journaled in one end of a connecting rod 171, the other end of which is enlarged and formed to embrace an eccentric 172, fast on cam shaft 51.

Referring to Figs. 8, 9 and 10, it will be seen that, as cam shaft 51 turns through 90° in the direction of the arrow from the position shown in Fig. 8, the rack slides 169 will be moved to the left, whereas the slides 158, which are connected to the journal bars 156 carrying shafts 155, will be moved somewhat to the right. These combined movements result in a 90° clock-wise rotation of each shaft 155 on which the eccentrics 154 are mounted, as well as in a horizontal translation of said shafts, thereby causing the plaiting frame 151 to move upwardly and to the right from the position shown in Fig. 8 to that shown in Fig. 9. During the next 90° rotation of shaft 51, the rack slides 169 are moved still further to the left, whereas slides 158 and the journal bars 156 are moved still further to the right, the combined movements resulting in a further 90° clock-wise rotation of each of the eccentric shafts 155, and in further translation of said shafts to the right, so that the plaiting frame is moved downwardly and to the right from the position shown in Fig. 9 to that shown in Fig. 10. During the next 180° of rotation of cam shaft 51, the rack slides 169 are moved to the right, whereas slides 158 and journal bars 156 are moved to the left, thus imparting a counter-clockwise rotation of 180° to shafts 155, exactly reversing the movement of the plaiting frame just described, and returning the parts to the position shown in Fig. 8.

A reed or yarn guide 174 is detachably mounted between the plaiting bars 143 and 144, and includes a series of transverse partitions 175 extending from one side wall to the other of the yarn guide and forming a reed through which the yarns of the warp A pass, and by means of which they are kept properly spaced with respect to each other. Flanges 176 extend toward each other from the lower edge of each side wall of the yarn guide, and the adjacent edges of these flanges are curled at 177 to form smooth surfaces against which the yarns bear as they pass through the yarn guide.

The plaiting bars 143 and 144 not only serve in their movement to plait the warp A about severable separator strips deposited in the mouth of the confining passage formed by the plates 145 and 146, but each of the plaiting bars, when it is away from the mouth of the passage, picks up one of the severable separator strips and transfers it to the mouth of the passage, where it is deposited and released by the plaiting bar.

There are two magazines for holding supplies of severable separator strips, one at each side of the machine, each serving one of the plaiting bars, as shown in Figs. 3 and 16. Cross-members 179 are connected to, and extend between, the side members 37, 38 of the frame, and these cross-members are located on opposite sides of the central portion of the machine. To each of them there is secured a bed plate 180 on which a supply of severable separator strips B is stacked on edge. This bed plate 180 has side flanges 181 to which a top plate 182 is bolted. Strips 183, secured to the top plate 182, extend laterally therefrom above the upper edges of the supply of strips. A follower 184, located on each of the channel-shaped bed plates 180, is provided with notches 193 through which the strips 183 extend as guides. A tail member 185 is fastened to the follower 184 and extends laterally therefrom. A lug 187, fastened to this tail member, extends downwardly through a slot 186 in the bed plate 180, and the end of a cable 188 is fastened to the lug 187. The cable passes over a pulley 189 journaled in a bracket 190 secured to the cross-member 179, and a weight 192 is connected to the lower end of the cable 188 by means of a spring 191. It will be seen that the spring and the weight tend to move the follower 184 toward the center of the machine, thus pressing the supply of severable separator strips B toward the feeding point. The follower 184 and the separator strips B move in the channel defined by the bed plate 180, top plate 182 and guide strips 183.

There are two strip-feeding devices, one for each of the two magazines. Each comprises a transverse shaft 194 journaled in brackets 193 formed in the ends of top plate 182. Cap screws 195 secure a front plate 196 to the front faces of top plate 182 and bed plate 180, the front plate being so formed as to leave a passageway of about the thickness of one of the separator strips between itself and the top and bed plates for the passage of a blade 197, which reciprocates in the channel thus formed. When the blade 197 is in its upper position, as shown at the left of Fig. 16, the supply of separator strips is forced by weight 192 against the corresponding front plate 196, so that the foremost separator strip B is beneath the lower edge of blade 197. When this feeding blade moves downwardly from the position shown at the left of Fig. 16 to the position shown at the right of that view, the foremost separator strip B is pushed down through the channel into the jaw of the strip-transferring device, which is at that time in position to receive said strip. The upper portions of blade 197 are clamped between transverse bars 198 and 198', the former of which have, at each end thereof, vertical bores 199 (Fig. 19) in which the vertical posts 200 are received. Thus, the bars 198, 198' and blade 197 are guided in their vertical reciprocations. The lower ends of posts 200 are secured within bosses 201 formed at the ends of end plate 196.

Horizontal pins 202, extending from the ends of bars 198, are journaled in the upper ends of links 203. The lower end of one of these links is pivotally connected to arm 204 of a bell crank lever secured to shaft 194 (Fig. 27), while the lower end of the opposite link 203 is pivotally connected to the end of an arm 204' (Fig. 3) also secured to shaft 194. The other arm 205 of said bell crank lever is connected, in the case of the feeding-device at the right, Fig. 1, to one end of a link 206, the opposite end of which is connected to the lower end of a lever 207 journaled on a shaft 208 carried by a bracket 211 (Fig. 1) secured to the frame member 43. Lever 207 carries a roller 209, engaging the edge of cam 210 fast on cam shaft 51. A spring 215, connected at one end to lever 207 and at the other to a spring support 215' (Fig. 3), draws lever 207 to the right, Fig. 27, holding roller 209 in engagement with the edge of cam 210 and tending to move blade 197 to its lowermost position. Bell-crank 204, 205, is on the front end of the right-hand shaft 194 and a similar bell crank is provided on the rear end of the left-hand shaft 194. Similar connections are provided for actuating blade 197 at the left of Fig. 16, and comprise lever 212 pivoted on shaft 217 carried by bracket 211, which lever carries a roller 214 engaging the edge of a corresponding cam 210' fast on cam shaft 51. The lower end of lever 212 is connected to one end of a link 213, the opposite end of which is connected to the bell-crank arm 205 corresponding to that shown in Fig. 27, but at the rear, and secured to shaft 194 to actuate blade 197, shown at the left of Figs. 1 and 16. A spring 216 tends to draw the lower end of lever 212 toward the left, so as to hold its roller 214 in engagement with the edge of cam 210', and tends to lower blade 197 connected thereto. It will be seen that, as cam shaft 51 revolves, the blades 197 will be reciprocated alternately so as to feed alternately a strip from one or the other of the two magazines, each holding a supply of separator strips.

Extending inwardly toward the center of the machine (Figs. 16 and 19 to 24) from the innermost leg 218 of each of the cross-members 179, are lugs 219. To each of the lugs 219 there is bolted a bracket 220 having a boss 221. In the bosses 221 of the alined brackets 220, there are journaled shafts 222 extending transversely of the machine. There is a strip-transferring device mounted on each of these shafts for use in transferring a separator strip from the adjacent strip-feeding device to the adjacent plaiting bar. Each strip-transferring device includes a main jaw member 223 having a semi-cylindrical portion 224 concentric with shaft 222. At each end of member 223, concentric with the semi-cylindrical portion 224, are integral sleeves 225, which embrace shaft 222 and are secured thereto. Diametrically in alignment with the shaft 222, member 223 has a flat bearing surface 226, in which there is formed a depressed seat 227, which is the width of one of the severable separator strips, and is adapted to receive said strip from the strip-feeding device. Extending at right angles to this seat through the portion 226, there is a pair of parallel guide-ways 228, and in the extended portions 229 of the member there are similar guide-ways 230, which are in line with guide-ways 228. Slots 231 are formed in the portion 226 and in the extended portions 229, as shown in Fig. 23. The other member of the device consists of a secondary jaw member 232, the main portion of which is slidable upon, and in engagement with, the portion 226 of member 223. The member 232 is provided with extended portions 233, which are arched so as to pass around the shaft 222, and which terminate in seats 234 adapted to engage the flat extended portions 229 of the main member. Feathers 235 are formed on the slidable member 232, which fit in the guide-ways 228 and 230 of the main member. Threaded studs 236, carried by the secondary jaw member, extend through the slots 231 of the main jaw member, and have thereon springs 237 compressed between the back of the main jaw member and nuts 238 threaded on the studs, so that the springs yieldingly hold the slidable secondary jaw member in engagement with the main jaw member.

Rollers 240 are journaled on pins extending from each end of the secondary jaw member 232, and work in cam slots 242 formed in plates 241 bolted to the brackets 220. The cam slots are of such shape that, as shaft 222 is rocked to carry the strip-transferring device from the vertical position, shown at the right of Fig. 16, to a horizontal position, as shown at the left of Fig. 16, the secondary jaw member will be caused to retract, that is, move toward shaft 222, so as to occupy the position with respect to the main jaw member indicated at the left of Fig. 16. Thus, the slidable secondary jaw member is in its extended position when the device occupies a vertical position, so that a separator strip forced downward by the blade 197 will enter the seat 227 between the fixed and slidable jaws. Then, as the shaft 222 is rocked through 90°, so as to present the seat 227 and the strip thereon in a horizontal position, the cam slots 242 will force the secondary jaw member to slide upon the main jaw member and uncover the strip in seat 227, so that said strip may be engaged by the corresponding plaiting bar, which is to remove the strip from the strip-transferring device and carry it over and deposit it in the mouth of the confining passage in which the plaited structure is to be formed.

Referring to Fig. 1, the right-hand strip-transferring device has an arm 243 fast on the front end of shaft 222, which arm is connected to one end of a link 244. The other end of link 244 carries a housing 244ᵃ in which are lodged two springs 244ᵇ engaging on opposite sides a pin 245 on the lower end of a lever 246 pivoted on the shaft 208. Lever 246 carries a roller 247 engaging in the cam race 248 of the double box cam 163 fast on shaft 51. The left-hand strip-transferring device has an arm 249 fixed to the rear end of shaft 222, which arm is connected at its lower end to one end of a link 250, the other end of which link is resiliently and pivotally connected at 251 to the lower end of a lever 252, pivoted on the shaft 217, and carrying a roller 253, which engages in the race 254 of the double box cam 163 (shown at the right in Fig. 3) fast on shaft 51. Link 250 is connected to lever 252 through springs 250ᵇ engaging pin 251, as shown in Fig. 31. These resilient connections between links 244, 250 and levers 246, 252 result in the strip-transferring devices being moved yieldingly to their limiting positions. This enables me to secure precise registry between the strip-transferring device in vertical position and the blade of the strip-feeder, and also permits of a yielding of the strip-transferring device, when in horizontal position, under pressure exerted by the plaiting bar when it engages a strip on the strip-transferring device. The latter action facilitates the transfer of separator strips to the plaiting bar.

A flange 255, depending from each bottom plate 180, carries a pair of threaded, adjustable, stop screws 256, which are engaged by the back of the secondary jaw member 232 of the strip-transferring device when it is moved to vertical position, so that seat 227 will be in accurate alinement with the corresponding blade 197, and so that that blade may force a severable separator strip B into said seat.

In order that each severable separator strip shall be retained upon the plaiting bar 143 or 144 while it is being carried by the plaiting bar from the corresponding strip-transferring device to, and is being deposited in, the mouth of the confining passage in which the plaited structure is formed, I have provided suction connections for each of these plaiting bars. In each plaiting bar there is a longitudinally-extending passage 257 (Fig. 16), closed at one end. Lateral passages 258 lead from the central passage to cup-shaped recesses 259 in the lower face of the plaiting bar. A flexible tube 261 (Fig. 25) is connected to the open end of the central passage 257 of plaiting bar 143, and a similar flexible tube 260 is connected to the similar passage 257 in the plaiting bar 144. Thus, when the tubes 260 and 261 are connected with a source of reduced pressure, suction is applied at the cup-shaped recesses 259, thus holding a separator strip against the lower face of the plaiting bar. When the tube 260, or 261, is disconnected from the source of suction and connected with atmosphere, the suction will be broken and the strip released from the plaiting bar.

It is also necessary to provide means for retaining a separator strip upon the main jaw member of the strip-transferring device while the device is being rotated from its vertical, strip-receiving position to its horizontal, strip-delivering position. Accordingly, I have provided suction connections for each of the strip-transferring devices for accomplishing this purpose. The longitudinal passage 262 (Fig. 22), closed at one end, is formed in the shaft 222. A block 263 having a lateral passage 264 therein is secured to the back of the semi-cylindrical portion 224 of the main jaw member by a cap-screw 265 screwed through said block, through said semi-cylindrical portion and into the shaft 222. The cap-screw 265 has an angular passage 266 communicating with the central passage 262 in the shaft 222, and registering with the lateral passage 264 in the block 263. Passage 264 is connected by tubing 267 to the horizontal portion 268 of a T-shaped passage formed in a block 269, which is secured to the back of the semi-cylindrical portion 224 of the main jaw member. The vertical portion 270 of the T-shaped passage in said block is connected by a short tube 271 (Fig. 19) to an angular passage 272 (Fig. 21) in another block 273, which is secured to the back of the portion 226 of the main jaw member. The angular passage 272 communicates with a short passage 274 in the upper portion of the main jaw member, which passage leads to a cup-shaped recess 275 formed in the seat 227 of said member. The passage 268 in block 269 is also connected by tubing 276 with an angular passage 277 formed in another block 278 secured to the back of the semi-cylindrical portion 224 of the main jaw member. This passage 277 is connected by tube 279 with a passage 280 in a block 281 fixed to the main jaw member, which passage communicates with a cup-shaped recess 282 formed in the seat 227 of said member. Thus, it will be seen that, by the tubing and passages described, the cup-shaped recesses 275 and 282 in the seat 227, on which the separator strip rests while it is being transferred, may be connected with a source of suction through a flexible tube 283, which is connected to the open end of the passage 262. The strip-transferring device at the other side of the machine is provided with similar passages leading to cup-shaped recesses in the seat 227 of the main jaw member, and these passages are connected to a flexible tube 284.

An angle bracket 285 (Figs. 2 and 13), attached to the side frame member 38, supports a valve body 286 in which is formed a longitudinal passage 287, closed at one end, and communicating at the open end with a tube 288 connected to a suitable source of reduced pressure. In the valve body 286 there are formed four valve cylinders 289, 290, 291 and 292, connected with the longitudinal passage 287 by lateral pasages 293, 294, 295 and 296, respectively. A piston valve is slidable in each of the cylinders 289, 290, 291 and 292, and each such valve comprises a valve stem 297 carrying at one end a piston 298, and, intermediate of its length, a piston 306. The outer end of the piston 298 is provided with a cup-shaped recess 299, which houses the upper end of a spring 300, the lower end of which engages a plug 301, which is screwed into the lower end of the valve cylinder, and which is provided with an air vent passage 302. Nipples 303 are screwed into the front of the valve body, and connect with passages 304 leading to the valve cylinders 289, 290, 291 and 292, respectively. The tubes 260, 261, 283 and 284, are connected to the nipples 303. Vents 305 are formed in the valve body 286, near the upper end thereof, and also communicate with the valve cylinders 289, 290, 291 and 292, said vents being located adjacent the pistons 306, so that they may be opened and closed thereby as the valve stems 297 reciprocate.

A block 306' is also secured to the bracket member 285, and is provided with guide-ways 307, of rectangular cross-section, and in line with valve cylinders 289, 290, 291 and 292 in the valve body 286. A plate 308, secured to the front of the block 306', closes the open sides of said guide-ways, and these ways serve to guide the slides 309. Above the block 306' the slides 309 are bifurcated, and carry rollers 310, which, under the pressure of springs 300, engage the edges of the corresponding cams 311, 312, 313 and 314, which cams are fast to a shaft 318 journaled in bearings 319 on said bracket. Also secured to the shaft is a sprocket 315 connected by chain 316 to a sprocket 317 fast on cam shaft 51.

It will be observed that sprockets 317 and 315 are of the same size, so that shaft 318 will be driven at the same rate as cam shaft 51. Pistons 298 and 306 are so spaced with reference to the ports 295 and the vents 305 that, when the valve stem 297 is depressed against the pressure of spring 300, piston 306 closes air vent 305, and piston 298 uncovers the port 295 connecting the valve cylinder with the longitudinal passage 287, so that nipple 303 and the tube connected thereto are cut off from the atmosphere and connected with the source of suction, as shown in Fig. 14. On the other hand, when valve stem 297 is permitted by the cam to rise under the pressure of spring 300, the piston 298 covers the port 293, 294, 295 or 296, connecting the suction passage 287 with the corresponding valve cylinder, and piston 306 uncovers the air vent 305, so that the nipple 303 is connected with atmosphere through said air vent.

Cams 311, 312, 313 and 314 are of such contour and so located around shaft 318, that the tubes 260, 261, 283 and 284 are connected with suction during the proper periods of the cycle, and are connected with atmosphere during the remaining portions of said cycle. For instance, each of the tubes 260 and 261, which are connected to the plaiting bars 143 and 144, is to be connected to the source of suction while the plaiting bar is traveling from its position adjacent the strip-transferring device to its position in the mouth of the confining passage formed by the plates 145 and 146, and is to be disconnected from suction and connected to atmosphere during its return motion. Likewise, the tubes 283 and 284 connected with the strip-transferring devices are to be connected with suction so that it is applied at the cup-shaped recesses 275 and 282 in the seats 227 while the corresponding strip-transferring device rotates from its vertical to its horizontal position, and the suction is then to be broken, so that a plaiting bar making contact with a strip on the main jaw member of the strip-transferring device, as shown at the left-hand portion of Fig. 16, may remove the strip from said jaw member and carry it over to its position in the mouth of the confining passage. Accordingly, the valve-actuating cams are so formed and located on the shaft which carries them, that the tubes 283 and 284 will be connected with a source of suction during that part of the cycle in which the corresponding strip-transferring device is rotating from the vertical to the horizontal position, and will be released from suction and connected to atmosphere during the remaining part of the cycle.

The cross pieces 41 of side frame members 37 and 38 are provided with inwardly extending flanges 320 (Fig. 17), to which are secured the lugs 321 located at the four corners of a frame 322, which has a central opening 323. The side members 324 of this frame are of channel cross-section, as shown in Fig. 28. A pair of parallel plates, 325, 326, which form a part of the confining passage for the plaited structure, extend vertically, and are provided with horizontal flanges 327, 328, bolted to the top surfaces of the side members 324. The plates 325, 326, are provided with recesses 329, 330, in the upper portions thereof, which recesses receive the plates 145 and 146 forming the mouth of the confining passage, said plates being secured to plates 325, 326, in said recesses. Each of the plates 145 and 146 is notched at its upper end, as at 331, to receive the retaining fingers hereinafter to be described. Inwardly projecting ribs 332 are formed on the adjacent faces of plates 325 and 326, and similar ribs 333 are formed on the adjacent faces of plates 145 and 146, said ribs 332 and 333 being in line with each other. The distance between the adjacent, opposed edges of ribs 332, 333, is substantially the same as the width of a separator strip B, being just enough greater to permit the strips to pass between the ribs in accurate vertical alignment, and it is less than the thickness of the plaited structure. These ribs form grooves in which the bights of the yarns plaited about the separator strips may engage as the plaited structure is fed through the confining passage and the distance between the bottoms of opposite grooves exceeds the thickness of the plaited structure, so that the bights of the yarn loops do not engage the bottoms of said grooves. This arrangement prevents lateral displacement of the plaited structure during its descent through the confining passage. By preventing contact of the bights of the yarn loops with the walls of the passage it practically eliminates friction as an element in the formation of the plaited structure. By retaining the separator strips in accurate vertical alignment it insures that the plaited structure reaches the cement-applying mechanism with the bights of the yarn loops most effectively exposed to the action of the latter. The lower ends of plates 325 and 326 are cut away at 334 so as to approach more closely to the peripheries of rollers 335 to be mentioned hereinafter.

Bosses 336 are formed in the upper corners of the plates 325 and 326, and the pins 337 are anchored in said bosses. Supporting bars 338 for the retaining fingers are slidably mounted on the pins 337. The retaining fingers are formed on the legs of U-shaped members, the bases 339 of which are secured to the bars 338, while the legs 340 extend inwardly toward the center of the machine. These legs have the form shown in Fig. 28, and include portions 341, which are slidable in the notches 331 of plates 145 and 146, and also retaining fingers 342 which, when bars 338 are moved toward each other, project into the mouth of the confining passage over the top of the uppermost separator strip B therein, to hold it in place while the plaiting bar moves away. Plaiting bars 143, 144, are notched at 178 on both edges to accommodate the retaining fingers. Spring 343, mounted on the pins 337, are compressed between the bars 338 and the washers 344 secured on the outer ends of the pins, and tend to move said bars and said fingers toward each other so as to project the fingers 342 above the separator strip last deposited in the mouth of the passage.

In order to move the bars 338 away from each other and thus withdraw the retaining fingers 342 from above the separator strip to permit the plaiting of yarn thereover and the depositing of a new separator strip on top thereof, lugs 345 (Fig. 17) are provided at the ends of the bars 338, and have threaded pins 346 adjustably mounted therein. These threaded pins are engaged by fingers 347 secured to shafts 348, which are journaled in L-shaped brackets 349 (Fig. 25) mounted on the member 322. Each shaft 348 has secured thereto, at the front thereof, an operating arm 350, 351 (Fig. 16), which arms project toward each other and carry rollers 352, 353, engaging cams 354, 355, which are fast on shaft 57. This shaft is journaled in brackets 356 and 357, which are mounted on the flange 320 and the member 322, respectively. I have already described the manner in which shaft 57 is driven, and (Fig. 16) it will be seen that, at a certain point in the cycle, as the shaft revolves, the lobes 358 and 359 on cams 354 and 355 will engage rollers 352 and 353, and thus rock the shafts 348 so as to cause bars 338, which carry the retaining fingers, to move away from each other against the tension of springs 343, thus withdrawing the fingers 342 from above the separator strip last deposited. When the lobes 358, 359, pass from beneath rollers 352, 353, springs 343 immediately project retaining fingers 342 above the separator strip B deposited during the interval when the fingers were withdrawn.

At the lower end of the confining passage formed by plates 325 and 326 there is located the mechanism (Figs. 1, 28 and 29) for rubberizing the opposite faces of the plaited structure as it emerges from this confining passage. This comprises the rolls 335 for applying a rubberizing compound such as rubber latex, or a compound thereof, or other cementing material, to said opposite faces of the plaited structure, and other rollers which friction the cementing compound into the opposed surface of the plaited structure. Cross-members 358, one at each side of the machine, are secured to the side frame members, 37, 38, and angle brackets 359 are mounted on the cross-members 358, being secured thereto adjustably by bolts 360 passing through elongated openings in the horizontal portions of the brackets. The upright legs of these brackets carry adjustable bolts 361 engaging portions of the frame members, 37, 38, by which the angle brackets 359 may be accurately positioned on the cross-members 358. Each angle bracket supports a plate 362 having a flange 363 resting on the horizontal leg of the corresponding bracket and secured thereto. These plates are arranged in pairs, one pair on each side of the path of the plaited structure, and each pair comprising one plate at each side of the machine. The plates of each pair are connected by tie rods 364, 365, and 366. Each frame, thus comprised of a pair of said plates and their connecting tie rods, supports a pan 367 containing the cementing compound, such as rubber latex, or a compound thereof, and, on the bottom of each pan are secured strips 368, which rest upon suitable supports including the rods 364.

A stub shaft 369, mounted to one side of pan 367, has journaled thereon a sprocket 370 over which runs a chain 371 connecting said sprocket with other sprockets secured to the shafts 68 and 69, respectively. A pinion 372, fixed to sprocket 370, meshes with a gear 373 fixed to a shaft 374 journaled in the side plates 362, which shaft carries a roller 375 dipping in the cementing compound in the corresponding pan 367. Pinion 376, which is fast to shaft 374, meshes with an idler pinion 377 journaled on a stud 378 supported by a side plate 362, and pinion 377 meshes with another idler pinion 379, likewise journaled on a stud 380 supported by a side plate 362. Pinion 379, in turn, meshes with a gear 381 secured to another shaft 382, which is journaled in the side plates 362, and carries the cement-applying roller 335 for applying the rubberizing compound to a surface of the plaited structure as it emerges from the lower end of the confining passage. It will be seen that roller 375, which dips in the rubberizing compound in pan 367, makes approximate contact with the roller 335 so as to transfer said compound thereto, and the latter applies it to the surface of the plaited structure.

Pinion 372 also meshes with a pinion 383 fixed to a shaft 384 journaled in the side plates 362 and carrying a roller 385 engaging the rubberized surface of the plaited structure. It will be noted that the gearing is such that the roller 385 runs at a materially higher speed than that of the applying-roller 335, thus serving to friction the applied cement into the bights of the yarn loops. It will also be noted that the applying-roller 335 rotates in such a direction that, where it makes contact with the plaited structure, its periphery is moving in the same direction with it. Its peripheral speed also substantially exceeds the rate of movement of the plaited structure, so that it has a wiping action upon the latter. It will be noted further that the direction of rotation of the supply-roller 375 is opposite to that of the applying-roller 335 with which it is associated, and that the gearing connecting these rollers is such that the supply-roller 375 rotates at a substantially higher speed than does the applying-roller 335, the result being that an excess of cement is carried upward from the trough 367 on the surface of the roller 375 into the nip between the latter and the roller 335, whose surface as it leaves the nip thus becomes coated uniformly with a film of cement which it carries to the point of application to the plaited structure.

It is desirable that the rollers 335 and 375 rotate in the directions just described because thus the excess of cement carried into the nip by the supply-roller most readily drains back into the trough. Furthermore, such direction of rotation brings the freshly-coated surface of the applying-roller 335 into a visible position, so that any deficiency of coating, or interruption such as might be occasioned by a foreign particle in the nip, may be readily observed.

It is desirable also that the peripheral speed of the applying-roller 335 be substantially higher than the rate of movement of the plaited structure in order that the desired amount of cement may be gradually and progressively applied to the base portion of each row of yarn loops during its passage through the point of tangency of the surface of the plaited structure with the surface of the applying-roller. By this progressive application of the cement, and by the accompanying friction effect, thorough penetration of the bights of the loops is achieved with the use of a minimum amount of cement, while the tendency of the cement to follow the line of least resistance by flowing between the loops and up their sides is substantially overcome. It may be pointed out here that irregularities in the distribution of the cement, such as results from substantial penetration here and there between the pile loops, or up their sides, greatly increases the difficulty of producing a material of uniform surface appearance, particularly when the pile height, wire, and pitch are low, as in the less expensive products.

The ends of shaft 374 are journaled in blocks 387 (Fig. 1), which are slidably mounted in slots 386 formed in the side plates 362. Springs 388, one interposed between one end of each of said slots and one of the blocks 387, normally tend to move the axis of the shaft 374 away from the axis of roller 335, thus tending to increase the distance between the rollers 335 and 375. This movement of shaft 374 is limited by stop pins 389 adjustably mounted in flanges 390 extending from side plates 362, which stop pins engage the blocks 387 to limit the movement of shaft 374 under the pressure of springs 388. By adjusting the pins 389 the spacing between rollers 335 and 375 can be changed so as to vary the thickness of the film of cementing composition transferred to roller 335 for application to the plaited structure. Since the mechanism of the cement-applying system is in geared connection with the drive of the plaiting mechanism, the means of adjustment just described furnishes a direct control of the amount of cement applied per unit of length of the product. This control may obviously be refined, and an instantly operable control superadded, by the inclusion in the drive of the cementing mechanism, of an infinitely variable speed-control device, a number of which are commercially well-known. Such a device might readily be interposed in the shaft 63 (Fig. 1—A) between the gears 62 and 64, thus permitting instantaneous variation of the amount of cement applied, without interruption of the operation of the machine.

There is one of these cement-applying units on either side of the plaited structure, so that there is a pair of cement-applying rollers 335 engaging opposite faces of the plaited structure as it emerges from the confining passage, and turning in opposite directions so that their peripheral portions in contact with the plaited structure move in the direction of feed of such structure. There is also a pair of friction rollers 385 engaging opposite faces of the plaited structure below the cement-applying rollers and turning so that their peripheral portions in contact with the plaited structure move in a direction opposed to the feed of said structure.

Below the cement-applying mechanism I have provided a pair of spaced parallel plates 391, 392 (Fig. 1—A), forming another confining passage in which the plaited structure, opposite faces of which have now been rubberized, is confined while the cementing compound is being dried thereon. Associated with the plates 391, 392, is a drier 393, by means of which warm air may be applied to the rubberized surfaces of the plaited structure to dry them. This drier is not described or illustrated in detail, since it may be substantially the same as that illustrated in Figs. 12 and 13 of my Patent No. 2,050,740, issued August 11, 1936, to which reference is hereby made.

At the lower ends of plates 391, 392, webs of cemented base fabric C are applied to the opposite faces of the plaited structure. Flanges 394, formed on cross-members 39 of the frame, have adjustably mounted thereon the bearing blocks 395, in which are journaled shafts 396 carrying the rollers 397. The spacing of these bearing blocks, and, consequently, the spacing of rollers 397, may be altered by means of an adjusting screw 398 interposed between blocks 395. The rollers 397 guide the coated surfaces of the webs C of cemented base fabric into pressure contact with the opposite coated faces of the plaited structure as it emerges from the lower end of the passage formed by the plates 391, 392. The webs come from suitable sources of supply (not shown), and pass over let-off rolls 399 secured to the shafts 81, 82, which rolls are covered with card-clothing of such a nature and so applied as to prevent the webs of base fabric in contact with it from slipping circumferentially in the direction of rotation of the rolls. The cohesion between the cemented surfaces of the webs C and the cemented surfaces of the plaited structure, as they are pressed into contact between the base fabric applying-rollers 397, transfers to the webs a tension due to the continuing formation of plaited material under compression. This tension tends to rotate the rolls 399, whose rotation is controlled and limited by that of the shaft 76 acting through the worms 77 and 78 and the worm-gears 79 and 80. Since the shaft 76 is connected by gearing with the drive of the plaiting mechanism, it is obvious that the rolls 399 and their associated gearing, in thus limiting the advance of the base fabric, and, through it, the advance of the plaited structure, to a definite ratio between such advance and a certain number of cycles of the plaiting mechanism, determines the number of pile tuft rows per unit of length in the product.

Shaft 76 is journaled in brackets 430 (Fig. 30) having bearing seats 401 in their upper edges, the shaft being held in place by the cap members 402. Stub shaft 72, from which drive is transmitted to shaft 76, is journaled in the bracket members 403 mounted on the side member 37 of the frame. Tumbler pinion 74 is journaled on a stud 407, which is carried by a sector 404 pivoted on a stud 72', which is co-axial with the shaft 72. The sector 404 is locked in position by a bolt 405 passing through a slot 406 in the bracket 403'. This arrangement permits the ready removal of the gear 75 from the shaft 76, and the substitution therefor of another gear of different size when it is desired to alter the "let-off" ratio of the rolls 399 in order to change the "wire" of the product.

After the application to the plaited structure of the webs C of cemented base fabric, it passes through the opening 36 in the base plate 35 of the machine, and thence to a vulcanizing apparatus, which is substantially the same as that covered by my Patent No. 2,051,011, issued August 11, 1936, to which reference is hereby made for details of construction of the vulcanizing apparatus. After leaving the vulcanizer, the plaited structure is split in two by a splitting knife, as indicated diagrammatically in my Patent No. 2,050,740, and the separate webs so formed, after the removal of the severed separator strips, are subjected to the usual beating, tigering, and shearing operations.

The operation of my improved apparatus should be apparent from the foregoing description, but will be summarized briefly. The yarn-supplying mechanism, comprising the clamping device, 91, 93, and the loop-forming bails 113 and 130, operates to create and maintain a slack supply of yarn or warp A from which the plaiting mechanism draws as needed. The severable separator strips B are stacked on edge in the two magazines, one at each side of the machine, on the base plates 180. The warp A passes from guide roll 89 downward, through the yarn guide 174 of the plaiting frame, the individual yarns of the warp being separated by partitions 175, and between the beaded edges 177 of flanges 176 to the mouth of the confining passage formed by plates 145, 146. Strips B are fed one by one from the magazines by reciprocating blades 197, which are so timed that, when the blade descends to feed a strip from the magazine, the corresponding strip-transferring device is in vertical position beneath the blade so that the strip is inserted into the seat 227 between the main jaw member 223 and the secondary jaw member 232. As soon as the strip is delivered to the strip-transferring device, the cam-actuated valve mechanism is effective to apply suction at the cup-shaped recesses 275 and 282 to hold the strip in the seat 227 while transfer takes place. The blade 197 now moves upwardly to its upper position preparatory to feeding another strip from the magazine, whereupon the strip-transferring device rocks from its vertical to its horizontal position, the secondary jaw member sliding on the main jaw member to uncover the strip held on seat 227. When the strip-transferring device is in its horizontal or strip-delivering position, one of the plaiting bars, 143 or 144, at the end of its semi-elliptical path descends on the strip B, now presented horizontally in seat 227, and engages the same. Due to the resilient connections between links 244 and 250 and levers 246 and 252, the transferring devices can yield somewhat under the pressure of the descending plaiting bar so as to effect a firm contact between the plaiting bar and strip B on seat 227. At this instant, the cam-actuated valve mechanism acts to break the suction at recesses 275 and 282, and to apply it at recesses 259 of the plaiting bar. Thus the strip is released by the strip-transferring device and adheres by suction to the plaiting bar which is to carry it to the mouth of the confining passage. The strip-transferring device now returns to its vertical position preparatory to receiving another separator strip from the strip-feeding device.

As the plaiting frame moves, the plaiting bar which made contact with strip B and removed it from the strip-transferring device, returns along its semi-elliptical path, carrying the strip from seat 227 to, and depositing it in, the mouth of the confining passage formed by plates 145 and 146. At the same time, the beaded edge 177 engages the warp and deflects it to one side, folding it over the strip B last deposited in the mouth of the confining passage. As the strip on the plaiting bar enters the mouth of the passage, cam lobes 358, 359, act to withdraw the retaining fingers 342 so that strip B may enter the confining passage. At this instant, the cam-actuated valve mechanism breaks the suction at recesses 259 so that the strip B is released from the plaiting bar, which leaves the mouth of the passage on its return movement. Retaining fingers 342 are then projected by springs 343 over strip B, retaining it in the confining passage.

The plaiting frame comprises a pair of plaiting bars, and there is a strip magazine, strip-feeder, and strip-transferring device on each side of the machine serving one of the plaiting bars. These devices are timed so as to work alternately, and, consequently, first one and then the other of the plaiting bars receives a separator strip from its strip-transferring device, and carries it to, and deposits it in, the mouth of the confining passage, at the same time plaiting the warp A over the strip B last previously deposited.

The action of the plaiting mechanism results in the formation of the plaited structure in the confining passage and the feeding of it downwardly therein. The ribs 333 and 332 maintain the separator strips in precise vertical alignment during their progress through the confining passage, so that the bights of the yarn loops make no contact with the walls of the passage, thus avoiding friction, and insuring that the plaited structure reaches the rubberizing mechanism in a condition most favorable to effective and economical rubberizing. As the plaited structure emerges from the lower end of the confining passage, the cement-applying rollers 335 apply the cementing compound to opposite faces of the plaited structure, which compound is frictioned in by rollers 385. The cement is then dried, and webs of base fabric applied as already described.

In Fig. 32, I have illustrated a modified arrangement including the apparatus of my present invention in the lay-out of equipment for the manufacture of cemented pile fabric. The yarns of warp A coming from a suitable source, for instance, a creel, pass through a thread board, pass around and between tension rolls 83, 84, under the first loop-forming bail 113, through the clamping device 91, 93, under the second loop-forming bail 130, over guide roll 89 to the plaiting mechanism, and through the plaiting frame between the plaiting bars 143, 144, to the mouth of the confining passage. The severable separator strips are stacked in the magazines and transferred to the mouth of the confining passage for the formation of the plaited structure as described. After rubberizing, the plaited structure passes through the drier which, as shown, may be located between two floors of a building, on the upper of which the mechanisms previously mentioned are located. From the drier the plaited structure passes through a curved guide, which changes its direction of movement to horizontal, thence through the mechanism for applying webs of base fabric, and thence between the platens of the vulcanizing press to the splitter. The last-mentioned devices, following the drier, are located on the lower floor of the building.

In Fig. 33 I have shown a modified form of plaiting and strip-transferring mechanism which is particularly adapted to high speed operation because the weight of moving parts has been greatly reduced. In this modified form of my invention the plaiting bars have been eliminated, and the strip-transferring devices transfer the strips from the strip-feeders and themselves deposit them, one by one, in the mouth of the confining passage, while a yarn guide, through which the warp A of yarns passes, moves back and forth over the mouth of the passage, plaiting the warp about the severable separator strips as they are deposited. The strip-transferring devices, one of which is arranged at each side of the mouth of said passage, work alternately, first one and then the other depositing a separator strip on top of the warp which the yarn guide has plaited over the separator strip last previously deposited in the mouth of the confining passage.

The yarn guide has bearing members 409 at each end thereof, which are slidably mounted on suitably supported rods 408. The yarn guide comprises four tubes or rods 410 extending between, and carried by, the bearing members 409, said rods being arranged at the four corners of a rectangle, as shown in Fig. 33. Partition plates 411 are supported by, and extend between, rods 410 forming a reed through which the yarns of warp A pass. These partitions serve to prevent lateral displacement of the yarns, and keep them spaced properly relative to each other. Links 413, one at each side of the machine, are pivotally connected at 412 to the bearing members 409, and the other ends of said links are pivotally connected to arms 414 of bell crank levers pivoted at 415, the other arms, 416, of which are pivotally connected to the lower ends of pitmans 417. The upper ends of said pitmans, together with the cap pieces 419 secured thereto, embrace eccentrics 418 fast on shaft 51, so that, as said shaft revolves, the bell cranks, 414, 416, are rocked, and the links 413 reciprocated, thus carrying the yarn guide back and forth over the mouth of the confining passage formed by plates 145 and 146 in which the plaited structure is formed.

One extreme position of the yarn guide is shown in full lines in Fig. 33, and the position which it occupies at the other extreme of its movement is shown in dotted lines in said figure. It will be noted that one or the other of the vertical pairs of tubes or rods 410 bears on the yarns of the warp as the yarn guide moves across the mouth of the confining passage, depending upon the direction of movement, and thus the warp of yarns is laid across the severable separator strip B last deposited in the mouth of the passage. Another separator strip B is then deposited in the mouth of the passage on the warp so laid over the preceding strip, and, as the yarn guide moves back, the warp A is bent around one edge of, and laid across the upper face of, the separator strip so deposited.

Extending across the machine, and located one at each side of the mouth of the passage formed by plates 145 and 146 there are journaled two hollow shafts 420, on each of which is fast a cylindrical sleeve 460 provided with a plurality of integral, equally-spaced arms 421. The arms on the one sleeve are formed reversely to those on the other, as shown in Fig. 33, and their outer ends terminate in, and are connected by, continuous, integrally-formed bars 461, as shown in Fig. 34 adapted to receive a severable separator strip B and to transfer it to the mouth of the confining passage. Gears 422 are secured to shafts 420, one such gear being secured to the rear end of the shaft shown at the left in Fig. 33, and a corresponding gear being secured to the front end of the right-hand shaft. The gear 422 on the right-hand shaft meshes with a slidably supported rack 423, which is connected by link 424 and pin 425 to the lower end of a lever 426 pivoted at 208. Lever 426 carries a roller 427 which works in the race 428 of a cam fast on shaft 51. Gear 422 on the left-hand shaft 420 meshes with a slidably supported rack 429 connected by link 430 and pin 431 to the lower end of lever 432 pivoted at 217. Lever 432 carries a roller 433 engaging in the race 434 of a cam fast on shaft 51. Thus, as shaft 51 revolves, the shafts 420 will be oscillated in proper timing, so that first one, and then the other of the bars 461, will move from the strip-receiving position, shown at the right in Fig. 33, to the strip-depositing position, shown at the left, and back.

Each of the two strip magazines is substantially the same as shown in the preferred embodiment of my invention, comprising a bottom plate 180 and a top plate 182. The bottom plate has a depending flange 255 carrying adjusting screws 256 for so limiting the bars 461 at one extremity of their movement as to bring them to rest accurately in strip-receiving position. The separator strips B in said magazine are fed forward under the pressure exerted on them by the weight 192 (Fig. 16). Instead of the blade 197 and associated parts of the strip-delivering mechanism of the first-described embodiment of my invention, a slide 437 is provided, whose end portions are adapted to slide in grooves 436 in guides 435 attached to the top plate 182 of the magazines. At its lower edge the slide 437 is provided with a recess or seat 439 adapted to receive a separator strip B from the supply in the magazine and present it to the bar 461.

The slides 437 are reciprocated, in proper timing, by mechanism such as that shown in Fig. 1 for reciprocating blades 197. Thus, each slide 437 carries pins 202 connected by links 203 to arms 204 of bell cranks pivoted at 194, the other arms 205 of which are connected, in the case of the right-hand strip-feeder, by link 206 to the lower end of lever 207 pivoted on the frame at 208. Lever 207 carries a roller 209 engaging a cam 210 fast on shaft 51. In the case of the left-hand strip-feeder, bell crank arm 205 is connected by link 213 to the lower end of lever 212 pivoted at 217 and carrying a roller 214 engaging cam 215 fast on shaft 51.

The separator strips B are held against the seats 439, or the faces of the bars 461, and released therefrom at the proper stages of the cycle, by the controlled application of suction. To that end, cavities 440 are formed in the heads 438 which are closed by plates 441 secured to the heads. Inlets 442 communicate with one end of each of the cavities 440, said inlets being connected by flexible tubes, such as 260, 261 (Fig. 2), with cam-actuated control valves such as are shown in Figs. 13-15, whereby the cavities 440 are subjected to suction and atmospheric pressure at the proper stages in the cycle. Cavities 440 are connected by passages 443 to cup-shaped recesses 444 in seats 439, whereby suction may be applied at said seat to hold a separator strip B therein, the strip being released when the suction is broken and the corresponding cavities 440 are connected to atmosphere.

The bore of each shaft 420 has an inlet 445 at one end connected by a flexible tube such as tubes 283, 284 (Fig. 2) to the cam-actuated valve mechanism shown in Figs. 13-15, so that the bores of shafts 420 may be connected to suction and atmosphere at the proper stages in the cycle. Passages 446 connect the bore of each shaft 420 with a recess 450 formed in a boss 462, integral with the sleeve 460, and closed by a plate 447. The recess 450 is connected by passages 448 in arms 421 with cup-shaped recesses 449 formed in the surface of the bar 461 which engages the separator strip B. Thus, suction may be applied at said surface to hold the strip thereto as it is being transferred from the strip-feeder to the mouth of the confining passage, said suction being released when the strip is to be deposited in said passage.

The operation of the plaiting mechanism above described is as follows: The warp A passes through the warp guide to the mouth of the confining passage between the opposite pairs of rods 410. In the use of a warp of yarns the individual yarns are separated and held from lateral displacement by the partitions 411. Each magazine contains a supply of severable separator strips B, resting on edge on the bottom plate 180, and fed toward head 438 by the pressure exerted by weight 192. Tracing the movement of the parts from the positions shown in Fig. 33 through a complete revolution of shaft 51, during the first half of the revolution the warp guide moves across the mouth of the confining passage formed by plates 145 and 146 to the dotted line position. At the same time, the left-hand shaft 420 is rotated so that bar 461 moves upwardly into engagement with stop pins 256. At the beginning of the cycle the left-hand slide 437 is at the top of its stroke, and the feeding pressure on the supply of strips B has lodged the foremost strip in seat 439, while suction is applied at the cup-shaped recess 444 to hold the strip in said seat. After the left-hand transfer arms have risen to their vertical position, the left-hand slide 437 moves down carrying with it strip B in seat 439 until, at the bottom of the stroke, strip B is positioned between seat 439 and the strip-engaging surface of the adjacent bar 461. At about this point in the cycle, suction will be released from recesses 444, and applied to recesses 449 in the face of bar 461, so that the strip is released from head 438 and held to the bar. At this time the parts at the left of Fig. 33 would occupy positions corresponding to the illustrated positions of the right-hand strip-feeding and strip-transferring devices.

At the beginning of the cycle the right-hand slide 438 moves up, the suction having been broken at recesses 444 and applied to recesses 449, so that strip B is released from seat 439 and retained by the bar 461. After head 438 has moved above the bar 461, the right-hand shaft 420, together with the sleeve 460, is rotated so as to move the arms 421 from the vertical to the horizontal, the bar 461 thus transferring strip B from the strip-feeder to the mouth of the confining passage formed by plates 145 and 146, and depositing it therein. Suction is cut off from recesses 449 at the instant the strip enters the mouth of the confining passage.

During the last half of the cycle, the warp guide moves from the dotted line to the full line position of Fig. 33, and the other parts return to the positions there shown in accordance with the descriptions previously given. Thus it appears that, during the first half-cycle, the warp is laid from right to left over the upper face of the strip last deposited, and a severable separator strip B from the right-hand magazine is deposited in the mouth of the passage on the warp so laid. During the last half-cycle, the warp is laid from left to right over the upper face of the strip deposited during the first half-cycle, and a strip B from the left-hand magazine is deposited in the mouth of the passage on the warp so laid. Thus the warp is plaited about the severable separator strips as they are deposited one by one in the confining passage.

In the specification and the appended claims, the term "warp" is used as meaning either a warp of spun yarns or a bat of unspun fibers.

I am aware that the apparatus here shown is susceptible of considerable variation without departing from the spirit of my invention and, therefore, I claim my invention broadly, as indicated by the appended claims.

What I claim is:

1. In a machine for making cemented pile fabric, the combination of means forming a confining passage in which is received a plaited structure formed from severable separator strips and a warp, plaiting mechanism for depositing said strips one by one in the mouth of said passage and plaiting the warp about them, a clamping device operating on said warp, means for opening and closing said clamping device on the warp, a loop-forming device operating on the warp in advance of the clamping device when the latter is closed, a second loop-forming device operating on the warp between the plaiting mechanism and the clamping device when the latter is opened, and means for actuating said mechanism and devices in such timed relation that a slack supply of warp is maintained from which the plaiting mechanism draws.

2. In a machine for making cemented pile fabric, the combination of means forming a confining passage in which is received a plaited structure formed from severable separator strips and a warp, plaiting mechanism for depositing said strips one by one in the mouth of said passage and plaiting the warp about them, a clamping device operating on said warp, a guide over which the warp passes to the plaiting mechanism, means for opening and closing said clamping device on the warp, a loop-forming device operating on the warp in advance of the clamping device when the latter is closed, a second loop-forming device operating on the warp between said guide and clamping device when the latter is opened, and means for actuating said mechanism and devices in such timed relation that a slack supply of warp is maintained between the clamping device and guide from which the plaiting mechanism draws the warp as needed.

3. In a machine for making cemented pile fabric, the combination of means forming a confining passage in which is received a plaited structure formed from severable separator strips and a warp, plaiting mechanism for depositing said strips one at a time in the mouth of said passage and plaiting the warp about them, a clamping device operating on said warp, spring means tending to close said clamping device on the warp, means for opening said clamping device, a guide over which the warp passes to the plaiting mechanism, a loop-forming bail operating on the warp in advance of the clamping device when the latter is closed to draw warp from the source of supply, a second loop-forming bail operating on the warp between the guide and the clamping device when the latter is opened to draw warp through the clamping device, and means for actuating said bails and plaiting mechanism in such timed relation to each other and to the clamping device as to maintain a slack supply of warp between the clamping device and the guide from which the plaiting mechanism draws warp as needed.

4. In a machine for making cemented pile fabric, the combination of means forming a confining passage in which is received a plaited structure formed from severable separator strips and a warp, a plaiting mechanism, a strip-holding magazine, a strip-transfer device, means for moving said device from strip-receiving to strip-delivering position and back, means for feeding a strip from said magazine to said device when the latter is in strip-receiving position, and means for actuating said plaiting mechanism to plait the warp about separator strips delivered one by one by said transfer device and deposited in the mouth of said passage.

5. In a machine for making cemented pile fabric, the combination of means forming a confining passage in which is received a plaited structure formed from severable separator strips and a warp, a plaiting mechanism, a strip-holding magazine, a strip-transfer device, means for moving said device from strip-receiving to strip-delivering position and back, means for feeding a strip from said magazine to said device when the latter is in strip-receiving position, and means for actuating said plaiting mechanism to take a strip from the device, when in strip-delivering position, and deliver it to and deposit it in the mouth of said passage.

6. In a machine for making cemented pile fabric, the combination of means forming a confining passage in which is received a plaited structure formed from severable separator strips and a warp, a plaiting mechanism including a plaiting bar, a strip-holding magazine, a strip-transfer device, means for moving said device from strip-receiving to strip-delivering position and back, means for feeding a strip from said magazine to said device, when the latter is in strip-receiving position, and means for actuating said plaiting mechanism to move the plaiting bar from engagement with the transfer device in strip-delivering position to the mouth of the passage and back.

7. In a machine for making cemented pile fabric, the combination of means forming a confining passage in which is received a plaited structure formed from severable separator strips and a warp, a plaiting mechanism including a plaiting bar, said plaiting bar having suction passages therein communicating with a surface of said bar to be engaged with a strip, a strip-holding magazine, a strip-transfer device, said device having suction passages therein communicating with a surface of said device to be engaged by a strip, means for moving said transfer device from strip-receiving to strip-delivering position and back, means for feeding a strip from said magazine to said device, when the latter is in strip-receiving position, suction connections to said suction passages, means for controlling said suction connections, and means for moving said plaiting mechanism to shift said bar from engagement with the transfer device in strip-delivering position to the mouth of the passage and back.

8. In a machine for making cemented pile fabric, the combination of means forming a confining passage in which is received a plaited structure formed from severable separator strips and a warp, a plaiting mechanism including a plaiting bar, said plaiting bar having suction passages therein communicating with a surface of said bar engageable with the separator strips, a strip-holding magazine, a strip-transfer device, said device having suction passages therein communicating with a surface of said device engageable with said separator strips, means for moving said transfer device from strip-receiving to strip-delivering position and back, means for feeding a strip from said magazine to said device, when the latter is in strip-receiving position, suction connections to said suction passages, a plurality of cam-actuated valves controlling said suction connections, and means for actuating said plaiting mechanism to move said plaiting bar from engagement with the transfer device in strip-delivering position to the mouth of the passage and back.

9. In a machine for making cemented pile fabric, the combination of means forming a confining passage in which is received a plaited structure formed from severable separator strips and a warp, a plaiting mechanism including a pair of parallel plaiting bars, a pair of strip-holding magazines, a pair of strip-transfer devices, means for moving each device from strip-receiving to strip-delivering position and back, means for feeding a strip from each of said magazines to its corresponding transfer device, when the latter is in strip-receiving position, and means for actuating the plaiting mechanism to shift said plaiting bars from a position in which one of them is in the mouth of said passage and the other in engagement with its transfer device, to a position in which the second bar is in the mouth of the passage and the first in engagement with its transfer device.

10. In a machine for making cemented pile fabric, the combination of means forming a confining passage in which is received a plaited structure formed from severable separator strips and a warp, a plaiting mechanism including a pair of parallel plaiting bars, a pair of strip-holding magazines, a pair of strip-feeding devices, a pair of strip-transfer devices, each movable from a strip-receiving to a strip-delivering position and back, and each receiving strips from one of said magazines by means of one of said strip-feeding devices, and means for actuating said plaiting mechanism to carry said plaiting bars alternately from the strip-delivering station of a transfer device to the mouth of said passage, whereby said strips are deposited one by one in said mouth and the warp plaited about them.

11. In a machine for making cemented pile fabric, the combination of means forming a confining passage in which is received a plaited structure formed from severable separator strips and a warp, a plaiting mechanism including a pair of parallel plaiting bars, each of said bars having suction passages therein communicating with a surface of said bar engageable with said strips, a pair of strip magazines, a pair of strip-feeding devices, a pair of strip-transfer devices, each movable from a strip-receiving to a strip-delivering position and back, each of said devices having suction passages therein communicating with a surface of said device engageable with said strips, suction connections to said passages, means for controlling said suction connections, and means for actuating said plaiting mechanism to carry said bars alternately from the strip-delivering station of a transfer device to the mouth of said passage, whereby said strips are deposited one by one in the said mouth and the warp plaited about them.

12. In a machine for making cemented pile fabric, the combination of means forming a confining passage in which is received a plaited structure formed from severable separator strips and a warp, a plaiting mechanism including a pair of parallel plaiting bars, each bar having suction passages therein communicating with a surface of the bar engageable with said strips, a pair of strip magazines, a pair of strip-feeding devices, a pair of strip-transfer devices, each movable from a strip-receiving to a strip-delivering position and back, each of said strip-transfer devices having suction passages therein communicating with a surface of said device engageable with said strips, suction connections for said passages, cam-actuated valves controlling said suction connections, and means for actuating said plaiting mechanism to carry said bars alternately from the strip-delivering station of a transfer device to the mouth of said passage, whereby said strips are deposited one by one in the said mouth and the warp plaited about them.

13. In a machine for making cemented pile fabric, a plaiting mechanism comprising the combination of a plaiting frame having a plurality of bearings, for eccentrics, a plurality of frame-operating shafts, eccentrics on said shafts and working in said bearings, journals for said shafts, and means for shifting said journals and rotating said shafts, whereby said frame is caused to move in a semi-elliptical path.

14. In a machine for making cemented pile fabric, a plaiting mechanism comprising the combination of a plaiting frame having a plurality of bearings for eccentrics, a plurality of frame-operating shafts, eccentrics on said shafts and working in said bearings, a plurality of slides in which said shafts are journaled, and means for reciprocating said slides and rotating said shafts, whereby said frame is caused to move in a semi-elliptical path.

15. In a machine for making cemented pile fabric, a plaiting mechanism comprising the combination of a plaiting frame having a plurality of bearings for eccentrics, a plurality of frame-operating shafts, eccentrics on said shafts and working in said bearings, journals for said shafts, pinions fixed on said shafts, slidable racks meshing with said pinions, and means for simultaneously shifting said journals and reciprocating said racks, whereby said frame is caused to move in a semi-elliptical path.

16. In a machine for making cemented pile fabric, a plaiting mechanism comprising the combination of a plaiting frame having a plurality of bearings for eccentrics, a plurality of frame-operating shafts, eccentrics on said shafts and working in said bearings, a plurality of slides in which said shafts are journaled, pinions fixed on said shafts, slidable racks meshing with said pinions, and means for simultaneously reciprocating said slides and racks, whereby said frame is caused to move in a semi-elliptical path.

17. In a machine for making cemented pile fabric, a plaiting mechanism comprising the combination of a plaiting frame having a plurality of bearings for eccentrics, a plurality of frame-operating shafts, eccentrics on said shafts and working in said bearings, journals for said shafts, a rotatable drive shaft, and means actuated by the rotation of said drive shaft for shifting said journals and rotating said eccentric-carrying shafts, whereby said frame is caused to move in a semi-elliptical path.

18. In a machine for making cemented pile fabric, a plaiting mechanism comprising the combination of a plaiting frame having a plurality of bearings for eccentrics, a plurality of frame-operating shafts, eccentrics on said shafts and working in said bearings, a plurality of slides in which said shafts are journaled, pinions fixed on said shafts, slidable racks meshing with said pinions, a rotatable driving shaft, and means actuated by the rotation of said shaft for simultaneously reciprocating said slides and racks, whereby said frame is caused to move in a semi-elliptical path.

19. In a machine for making cemented pile fabric, a plaiting mechanism comprising the combination of a plaiting frame having a plurality of bearings for eccentrics, a plurality of frame-operating shafts, eccentrics on said shafts and working in said bearings, a plurality of slides in which said shafts are journaled, pinions fixed on said shafts, slidable racks meshing with said pinions, a rotatable driving shaft, cams on said shaft connected to reciprocate said slides, and eccentrics on said shaft connected to reciprocate said racks, whereby said frame is caused to move in a semi-elliptical path.

20. In a machine for making cemented pile fabric, the combination of means forming a confining passage in which is received a plaited structure formed from severable separator strips and a warp, a strip-holding magazine, a strip-transfer device, means for feeding a strip from the magazine to said device, means for actuating the device to transfer a strip to the mouth of said passage, a warp guide through which the warp passes to said mouth, and means for reciprocating said warp guide across the mouth of said passage, whereby the warp is plaited about strips deposited in said mouth by the transfer device.

21. In a machine for making cemented pile fabric, the combination of means forming a confining passage in which is received a plaited structure formed from severable separator strips and a warp, a strip-holding magazine, a strip-transfer device oscillatable from strip-receiving to strip-delivering position, means for feeding a strip from said magazine to said device when the latter is in strip-receiving position, means for oscillating said device from strip-receiving position to strip-delivering position at the mouth of said passage, a warp guide through which the warp passes to said mouth, and means for reciprocating said warp guide across the mouth of said passage, whereby the warp is plaited about strips deposited in said mouth by the transfer device.

22. In a machine for making cemented pile fabric, the combination of means forming a confining passage in which is received a plaited structure formed from severable separator strips and a warp, a strip-holding magazine, a rotatable shaft, strip-transfer arms thereon, means for feeding a strip from the magazine to said arms, means for oscillating said shaft to move said arms from strip-receiving position to a strip-delivering position at the mouth of said passage, a warp guide through which the warp passes to said mouth, and means for reciprocating said warp guide across the mouth of said passage, whereby the warp is plaited about strips deposited in said mouth by said transfer arms.

23. In a machine for making cemented pile fabric, the combination of means forming a confining passage in which is received a plaited structure formed from severable separator strips and a warp, a strip-holding magazine, a rotatable shaft, a strip-transfer device thereon having surfaces engageable by a strip, means for oscillating said shaft to move said surfaces from strip-receiving position to the mouth of said passage, means for feeding a strip from said magazine to said surfaces when the latter are in strip-receiving position, a warp guide through which the warp passes to said mouth, and means for reciprocating said warp guide across the mouth of said passage, whereby the warp is plaited about strips deposited in said mouth by the transfer device.

24. In a machine for making cemented pile fabric, the combination of means forming a confining passage in which is received a plaited structure formed from severable separator strips and a warp, a strip-holding magazine, a strip-transfer device, means for feeding a strip from the magazine to said device, means for actuating said device to transfer a strip to the mouth of said passage, a warp guide through which the warp passes to said mouth and including a plurality of partitions between which the yarns of said warp pass, and means for reciprocating said warp guide across the mouth of said passage, whereby the warp is plaited about strips deposited in said mouth by the transfer device.

25. In a machine for making cemented pile fabric, the combination of means forming a confining passage in which is received a plaited structure formed from severable separator strips and a warp, a strip-holding magazine, a strip-transfer device, means for feeding a strip from the magazine to said device, means for actuating the device to transfer a strip to the mouth of said passage, a warp guide through which the warp passes to said mouth and including a pair of reciprocable end members, a plurality of rods connecting said end members and a plurality of partitions extending between said rods and between which the yarns of said warp pass, and means for reciprocating said end members to carry the warp guide across the mouth of said passage, whereby the warp is plaited about strips deposited in said mouth by the transfer device.

26. In a machine for making cemented pile fabric, the combination of means forming a confining passage in which is received a plaited structure formed from severable separator strips and a warp, a pair of strip-holding magazines, a pair of strip-transfer devices, a pair of strip-feeding means, one for each of said magazines, for feeding strips from said magazine to the transfer device associated therewith, means for actuating said transfer devices to transfer, alternately, strips from said magazines to the mouth of said passage, a warp guide through which the warp passes to said mouth, and means for reciprocating said warp guide across the mouth of said passage, whereby the warp is plaited about the strips deposited in said mouth by the transfer devices.

27. In a machine for making cemented pile fabric, the combination of means forming a confining passage in which is received a plaited structure formed from severable separator strips and a warp, a pair of strip-holding magazines, a pair of shafts, strip-transfer arms on each shaft, means for oscillating said shafts alternately so as to move said arms from strip-receiving position to strip-delivering position at the mouth of said passage, means for feeding strips from said magazines to the transfer arms associated therewith when the latter are in strip-receiving position, a warp guide through which the warp passes to said mouth, and means for reciprocating said warp guide across the mouth of said passage, whereby the warp is plaited about strips deposited in said mouth by the transfer arms.

28. In a machine for making cemented pile fabric, the combination of a pair of spaced parallel plates forming a confining passage a plaited structure formed from separator strips and a warp, posts mounted on said plates, a pair of bars slidably mounted on said posts, springs urging said bars toward each other, a plurality of retaining fingers mounted on said bars and projected by said springs into the mouth of said passage, and can means operative to separate said bars against the pressure of said springs to withdraw said fingers from the mouth of said passage.

29. In a machine for making cemented pile fabric, the combination of a pair of spaced parallel plates forming a confining passage a plaited structure formed from separator strips and a warp, there being notches formed in the upper portions of said plates, means for successively depositing separator strips in the mouth of said passage and plaiting the warp about them, a plurality of posts mounted on said plates, a pair of bars slidably mounted on said posts, spring means urging said bars toward each other and toward the plates, a plurality of U-shaped members mounted on said bars and having retaining fingers formed on the legs thereof and working in the notches of said plates, and cam means operative to separate said bars against the pressure of said springs to withdraw said retaining fingers from the mouth of said passage.

30. In a machine for making cemented pile fabric, the combination of a pair of spaced parallel plates forming a confining passage a plaited structure formed from separator strips and a warp, means for successively depositing separator strips in the mouth of said passage and plaiting the warp about them, a plurality of posts mounted on said plates, a pair of bars slidably mounted on said posts, spring means urging said bars toward each other, retaining fingers on said bars and adapted to be projected into the mouth of said passage, a pair of shafts, rock arms on said shafts engageable with said bars, and means for rocking said shafts to move said bars from each other against the pressure of said springs.

31. In a machine for making cemented pile fabric, the combination of a pair of parallel spaced plates forming a confining passage in which is received a plaited structure formed from separator strips and a warp, said plates having a plurality of ribs projecting into said passage and engaged by the edges of said strips for maintaining them in accurate alignment, and means for plaiting the warp about successive separator strips and feeding the plaited structure through said confining passage.

32. In a machine for making cemented pile fabric, the combination of a pair of parallel spaced plates forming a confining passage in which is received a plaited structure formed from separator strips and a warp, said plates having a plurality of parallel grooves extending longitudinally thereof and formed by ribs extending into said passage, and means for plaiting the warp about successive separator strips and feeding the plaited structure through said confining passage, said strips being maintained in alignment by said ribs and the bights of individual yarns of the warp plaited about said strips being received in said grooves.

33. In a machine for making cemented pile fabric, the combination of a pair of opposed parallel spaced plates forming a confining passage in which is received a plaited structure formed from separator strips and a warp, said plates having a plurality of ribs projecting into said passage for maintaining the separator strips in accurate alignment, and means for plaiting the warp about successive separator strips and feeding the plaited structure through the confining passage, the plates being spaced apart a distance greater than the thickness of the plaited structure and the ribs on the opposed plates being spaced from each other a distance substantially equal to the width of the strips.

34. In a machine for making cemented pile fabric including plaiting mechanism and strip-transfer mechanism, the combination of suction connections to said strip transfer mechanism, a valve body having a plurality of valve chambers with which said suction connections communicate, a passage in said valve body communicating with said valve chambers, means connecting said passage with a source of suction, ports connecting each chamber with the atmosphere, a slidable valve in each chamber controlling said ports and the communication with said passage, and means for reciprocating said valves in timed relation to the strip-transfer mechanism.

35. In a machine for making cemented pile fabric including plaiting mechanism having a pair of plaiting bars, and strip-transfer mechanism, the combination of suction connections to said plaiting bars and strip-transfer mechanism, a valve body having a plurality of valve chambers with which said suction connections communicate, a passage in said valve body communicating with said valve chambers, means connecting said passage with a source of suction, ports connecting each chamber with the atmosphere, a slidable valve in each chamber controlling said ports and the communication with said passage, and means for reciprocating said valves in timed relation to said plaiting and strip-transfer mechanisms.

36. In a machine for making cemented pile fabric including plaiting mechanism and strip-transfer mechanism, the combination of suction connections to said strip-transfer mechanism, a valve body having a plurality of valve chambers with which said suction connections communicate, a passage in said valve body communicating with said valve chambers, means connecting said passage with a source of suction, ports connecting each chamber with the atmosphere, a slidable valve in each chamber controlling said ports and the communication with said passage, a cam shaft, a plurality of cams on said shaft for reciprocating said valves, and means for driving said cam shaft in timed relation with said strip-transfer mechanism.

37. In a machine for making cemented pile fabric including plaiting mechanism and strip-transfer mechanism, the combination of suction connections to said strip-transfer mechanism, a valve body having a plurality of valve chambers with which said suction connections communicate, a passage in said valve body communicating with said valve chambers, means connecting said passage with a source of suction, ports connecting each chamber with the atmosphere, a slidable valve in each chamber controlling said ports and the communications with said passage, spring means urging said valves in one direction, a cam shaft, cams on said shaft engaging said valves to move them in the opposite direction, and means for driving said cam shaft in timed relation with the strip-transfer mechanism.

38. In a machine for making cemented pile fabric, the combination of a pair of parallel spaced plates forming a confining passage in which a plaited structure formed by plaiting a warp about separator strips is supported and guided, said plates having a plurality of ribs projecting into said passage and engaged by the edges of the strips of said plaited structure for maintaining said strips in accurate alinement in the passage, and means for feeding said plaited structure longitudinally of the confining passage.

PAUL S. SMITH.